(12) United States Patent
Darcy et al.

(10) Patent No.: US 11,556,683 B2
(45) Date of Patent: Jan. 17, 2023

(54) FIBROUS COMPOSITE FAILURE CRITERIA WITH MATERIAL DEGRADATION FOR FINITE ELEMENT SOLVERS

(71) Applicant: The United States of America, as represented by the Secretary of the Navy, Arlington, VA (US)

(72) Inventors: Joseph Darcy, New Castle, DE (US); Young Wuk Kwon, Monterey, CA (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 241 days.

(21) Appl. No.: 16/438,704

(22) Filed: Jun. 12, 2019

(65) Prior Publication Data
US 2019/0384878 A1    Dec. 19, 2019

Related U.S. Application Data

(60) Provisional application No. 62/684,889, filed on Jun. 14, 2018.

(51) Int. Cl.
*G06F 30/23* (2020.01)
*G06F 111/10* (2020.01)

(52) U.S. Cl.
CPC .......... *G06F 30/23* (2020.01); *G06F 2111/10* (2020.01)

(58) Field of Classification Search
CPC ............................ G06F 30/23; G06F 2111/10
See application file for complete search history.

(56) References Cited

U.S. PATENT DOCUMENTS

2015/0170022 A1* 6/2015 Malik ..................... G06F 30/23
706/21

OTHER PUBLICATIONS

Kwon, "Multiphysics and Multiscale Modeling Techniques and Applications", Oct. 5, 2015, Textbook, ISBN 9781482244588 (Year: 2015).*

(Continued)

*Primary Examiner* — Bijan Mapar
*Assistant Examiner* — David A Hopkins
(74) *Attorney, Agent, or Firm* — Naval Postgraduate School; Scott Bell

(57) ABSTRACT

A method and system for modeling fibrous composites. Initially, material properties are obtained for a model of a fibrous composite, where the model includes integration points and unit cells. For each integration point, composite level stresses and strains are determined based on the material properties, the composite level stresses and strains are decomposed into component level stresses and strains for the integration point, the component level stresses and strains are used to calculate failure quotients at the integration point, an appropriate material reduction model is applied at a component level based on the failure quotients to detect a component failure, the component failure is upscaled to determine updated material properties at a composite level, and the updated material properties are incorporated into the model. At this stage, a composite failure is detected based on the updated model.

12 Claims, 7 Drawing Sheets

(56) References Cited

OTHER PUBLICATIONS

Kwon, Y. W., D. H. Kim, and T. Chu. "Multi-scale modeling of refractory woven fabric composites." Journal of materials science 41.20 (2006): 6647-6654. (Year: 2006).*
Feng, Xi-Qiao, et al. "Effective elastic and plastic properties of interpenetrating multiphase composites." Applied Composite Materials 11.1 (2004): 33-55. (Year: 2004).*
Zhang, Chao, et al. "Progressive damage simulation of triaxially braided composite using a 3D meso-scale finite element model." Composite Structures 125 (2015): 104-116. (Year: 2015).*
Bednarcyk, Brett A., Jacob Aboudi, and Steven M. Arnold. "Micromechanics modeling of composites subjected to multiaxial progressive damage in the constituents." AIAA journal 48.7 (2010): 1367-1378. (Year: 2010).*
Tang, Zhanwen, and Boming Zhang. "Prediction of biaxial failure envelopes for composite laminates based on Generalized Method of Cells." Composites Part B: Engineering 43.3 (2012): 914-925. (Year: 2012).*
Kwon, Young W. "Multi-level approach for failure in woven fabric composites." Advanced Engineering Materials 3 (2001). (Year: 2001).*
• Darcy, "Failure Model for Fibrous Composites Using Multiscale Modeling", 2018, PhD Dissertation from the Naval Postgraduate School (Year: 2018).*
Kwon, Y. W., and K. Roach. "Unit-cell model of 2/2-twill woven fabric composites for multi-scale analysis." CMES 5 (2004): 63-72. (Year: 2004).*
Kwon, Y. W., and A. Altekin. "Multilevel, micro/macro-approach for analysis of woven-fabric composite plates." Journal of composite materials 36.8 (2002): 1005-1022. (Year: 2002).*
Pineda, Evan J., et al. "Progressive failure of a unidirectional fiber-reinforced composite using the method of cells: Discretization objective computational results." International Journal of Solids and Structures 50.9 (2013): 1203-1216. (Year: 2013).*
Ricks, Trenton M., et al. "Mechanical Model Development for Composite Structural Supercapacitors." (2016). (Year: 2016).*
Aghdam, M. M., and A. Dezhsetan. "Micromechanics based analysis of randomly distributed fiber reinforced composites using simplified unit cell model." Composite structures 71.3-4 (2005): 327-332. (Year: 2005).*
Bigaud, D., and P. Hamelin. "From geometrical description to mechanical prediction-application to woven fabric composites." Science and Engineering of Composite Materials 7.4 (1998): 291-298. (Year: 1998).*
Zhang, Bo Ming, and Lin Zhao. "Progressive damage and failure analysis of fiber-reinforced laminated composites containing a hole." Advanced Materials Research. vol. 314. Trans Tech Publications Ltd, 2011. (Year: 2011).*
Zhao, Libin, et al. "Three-dimensional progressive damage models for cohesively bonded composite π joint." Journal of Composite Materials 48.6 (2014): 707-721. (Year: 2014).*
Ivančević, Darko, and Ivica Smojver. "Micromechanical damage modelling using a two-scale method for laminated composite structures." Composite Structures 108 (2014): 223-233. (Year: 2014).*
Zhang, B. M., and L. Zhao. "Progressive damage and failure modeling in fiber-reinforced laminated composites containing a hole." International Journal of Damage Mechanics 21.6 (2012): 893-911. (Year: 2012).*
Jiang, Hongyong, et al. "Evaluations of failure initiation criteria for predicting damages of composite structures under crushing loading." Journal of Reinforced Plastics and Composites 37.21 (2018): 1279-1303. (Year: 2018).*
Kowalkowski et al., "Test Methods for Measuring Material Properties of Composite Materials in all Three Material Axes", Jan. 24, 2012, accessed via the United States Defense Technical Information Center, Accession No. ADA583408 (Year: 2012).*
Sun et al., "Comparative Evaluation of Failure Analysis Methods for Composite Laminates", May 1996, United States Federal Aviation Administration, Report No. DOT/FAA/AR-95/109 (Year: 1996).*
Chaterjee et al., "Test Methods for Composites a Status Report vol. II: Compression Test Methods", Jun. 1993, United States Federal Aviation Administration, DOT/FAA/CT-93/17 (Year: 1993).*
Nelson et al., "Composite Laminate Failure Parameter Optimization Through Four-Point Flexure Experimentation and Analysis", 2015, Sandia National Laboratories, SAND2015-1335J (Year: 2015).*
C. Sun, B. Quinn, J. Tao, and D. Oplinger, "Comparative evaluation of failure analysis methods for composite laminates." Purdue University, School of Aeronautics and Astronautics, DOT/FAA/AR-95/109, May 1996.
S. W. Tsai and E. M. Wu, "A general theory of strength for anisotropic materials," Journal of Composite Materials, vol. 5, No. 1, pp. 58-80, Jan. 1971.
Z. Hashin, "Failure criteria for unidirectional fiber composites," Journal of Applied Mechanics, vol. 47, No. 2, pp. 329-334, Jun. 1980.
P. Gotsis, C. Chamis, and L. Minnetyan, "Prediction of composite laminate fracture: Micromechanics and progressive fracture," in Failure Criteria in Fibre Reinforced Polymer Composites: The World-Wide Failure Exercise, M. Hinton, A. Kaddour, and P. Soden, Eds. Oxford: Elsevier, 2004, pp. 98-120.
D. Robbins, "Efficient multiscale modeling of progressive failure in composite laminates," in 49th. AIAA/ASME/ASCE/AHS/ASC Structures, Structural Dynamics and Materials Conference, 2008.
Y. W. Kwon and J. Berner, "Micromechanics model for damage and failure analyses of laminated fibrous composites," Engineering Fracture Mechanics, vol. 52, No. 2, pp. 231-242, Sep. 1995.
Y. W. Kwon and C. Kim, "Micromechanical model for thermal analysis of particulate and fibrous composites," Journal of Thermal Stresses, vol. 21, No. 1, pp. 21-39, Jan. 1998.
Y. W. Kwon and M. S. Park, "Versatile micromechanics model for multiscale analysis of composite structures," Applied Composite Materials, vol. 20, No. 4, pp. 673-692, Aug. 2013.
A. M. Moncada, A. Chattopadhyay, B. A. Bednarcyk, and S. M. Arnold, "Micromechanics-based progressive failure analysis of composite laminates using different constituent failure theories," Journal of Reinforced Plastics and Composites, vol. 31, No. 21, pp. 1467-1487, Nov. 2012. Available: http://jrp.sagepub.com/ content/31/21/1467.
J. Gordis, "Artificial boundary conditions for model updating and damage detection," Mechanical Systems and Signal Processing, vol. 13, No. 3, pp. 437-448, Oct. 1999.
M. D. Bouwense, "Experimental validation of model updating and damage detection via eigenvalue sensitivity methods with artificial boundary conditions," M.S. thesis, NPS, Monterey, CA, USA, 2017.

* cited by examiner

FIBROUS COMPOSITE FAILURE CRITERIA WITH MATERIAL DEGRADATION FOR FINITE ELEMENT SOLVERS

CROSS-REFERENCE TO RELATED APPLICATIONS

This application claims the benefit of U.S. Provisional Application No. 62/684,889, filed Jun. 14, 2018, which is hereby incorporated in its entirety by reference.

BACKGROUND OF THE INVENTION

1. Field of the Invention

The present invention relates generally to methods and systems for applying fibrous composite failure criteria with material degradation to finite element solvers.

2. Description of the Related Art

In recent years, two prominent investigations into the characterization and prediction of composite failure, the World-Wide Failure Exercise I and II, have been initiated and completed in 2004 and 2013. The investigations explore the effectiveness and utility of many different composite failure theories against many sets of experimental data. The World-Wide Failure Exercise (WWFE) was prompted mostly because many theories have been put forth to understand the ultimate strength of composites. Most of these theories begin from the better-understood homogeneous and isotropic metals and plastics and add correction factors to account for the observed differences. Few of the failure theories, however, approach composites from the direction that a composite is an assemblage of various parts, each of them with particular properties, ways of interacting, and ultimate failure conditions.

Common evaluations used in composite failure theories are limit criteria, interactive criteria, and separate mode criteria. The maximum stress and maximum strain criteria belong to the limit criteria while Hill-Tsai and Tsai-Wu criteria are examples of interactive criteria. Alternatively, Hashin-Rotem and Hashin criteria are the separate mode criteria. While the theories listed here are popular choices for designers and finite element software manufacturers, there are many additional criteria proposed. All of the theories relied exclusively on the in situ composite-level uniaxial failure values to predict failures in the quadrants, i.e., the combined stress states.

SUMMARY OF THE INVENTION

Embodiments in accordance with the invention relate to modeling fibrous composites. Initially, material properties are obtained for a model of a fibrous composite, where the model includes integration points and unit cells. For each integration point, composite level stresses and strains are determined based on the material properties, the composite level stresses and strains are decomposed into component level stresses and strains for the integration point, the component level stresses and strains are used to calculate failure quotients at the integration point, an appropriate material reduction model is applied at a component level based on the failure quotients to detect a component failure, the component failure is upscaled to determine updated material properties at a composite level, and the updated material properties are incorporated into the model. At this stage, a composite failure is detected based on the updated model.

In some embodiments, the composite level stresses and strains are decomposed by generating a relationship matrix based on the material properties, partially inverting the relationship matrix to generate a downscaling matrix, and using the inverted relationship matrix to decompose the composite level stresses and strains to the component level stresses and strains.

In some embodiments, the component failure are upscaled to determine the updated material properties at the composite level by multiplying a combined stiffness matrix and the downscaling matrix to generate a distributed stiffness matrix, linearly combining and weighting directional stiffnesses to generate a normal stiffness matrix for the fiber composite, and inverting the normal stiffness matrix, where the updated material properties are extracted from the inverted normal stiffness matrix.

In some embodiments, the component failure is upscaled to determine the updated material properties at the composite level by estimating a shear modulus of each half cell of a target unit cell by combining corresponding shear moduli of corresponding quarter cells, where each of the corresponding shear moduli is weighted by a cross-sectional area of corresponding quarter cell in a plane of interest and combining the shear modulus of the half cells to obtain an upscaled shear modulus for the target unit cell, where the updated material properties also includes the upscaled shear modulus.

In some embodiments, the appropriate material reduction model is a fiber failure in tension model, a fiber failure in compression model, a fiber-matrix interface failure model, or a matrix failure model.

In some embodiments, each of the unit cells comprises eight subcells, where two of subcells represent fiber properties of the fibrous composite and the six remaining cells represent matrix properties of the fibrous composite.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

Embodiments described herein attempt to reconcile the performance of a composite as the collection of constituent materials and their interactions for a range of composite materials. An established multiscale model for materials is used as the basis for a failure model for fiber composites. The model's computation is explained so that its results can be used to formulate the inputs to the failure model. The failure model proposed employs homogenization and disaggregation methods that are enabled by micro-scale modeling of the material's constituents. This failure model is then used to define strength reductions in the composite at the micro-level. The strength reductions enable the definition of a progressive failure methodology for application to the micro-scale, and ultimately, the macro-scale composite. The failure model, the degradation model, and the multi-scale model they are based upon are combined in a computational program for inclusion in finite element software for efficient solving and prediction of intact and failed composite structural response.

Figure 1:
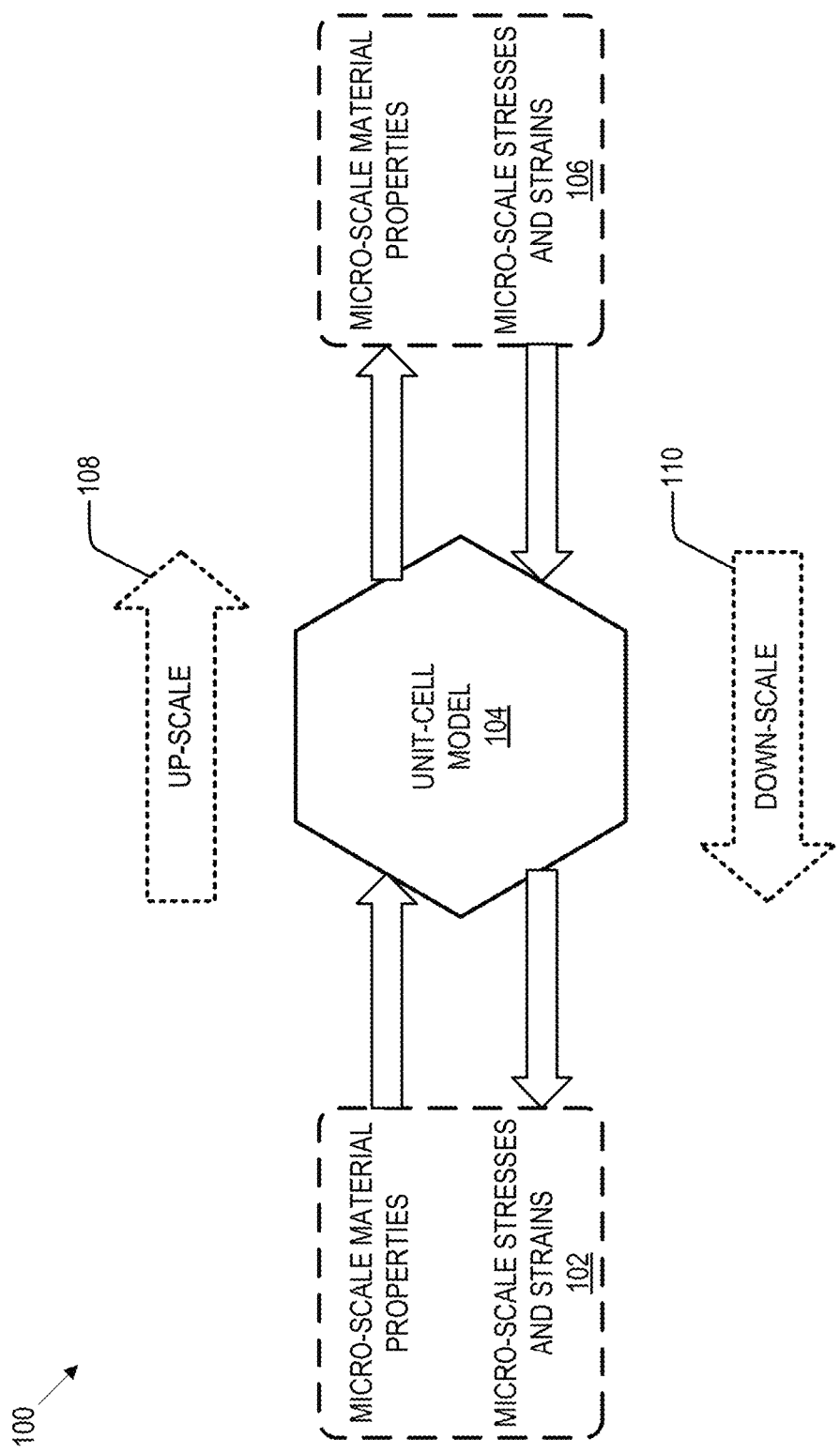
FIG. 1 illustrates a schematic diagram of multiscale coupling.
Figure 2A:
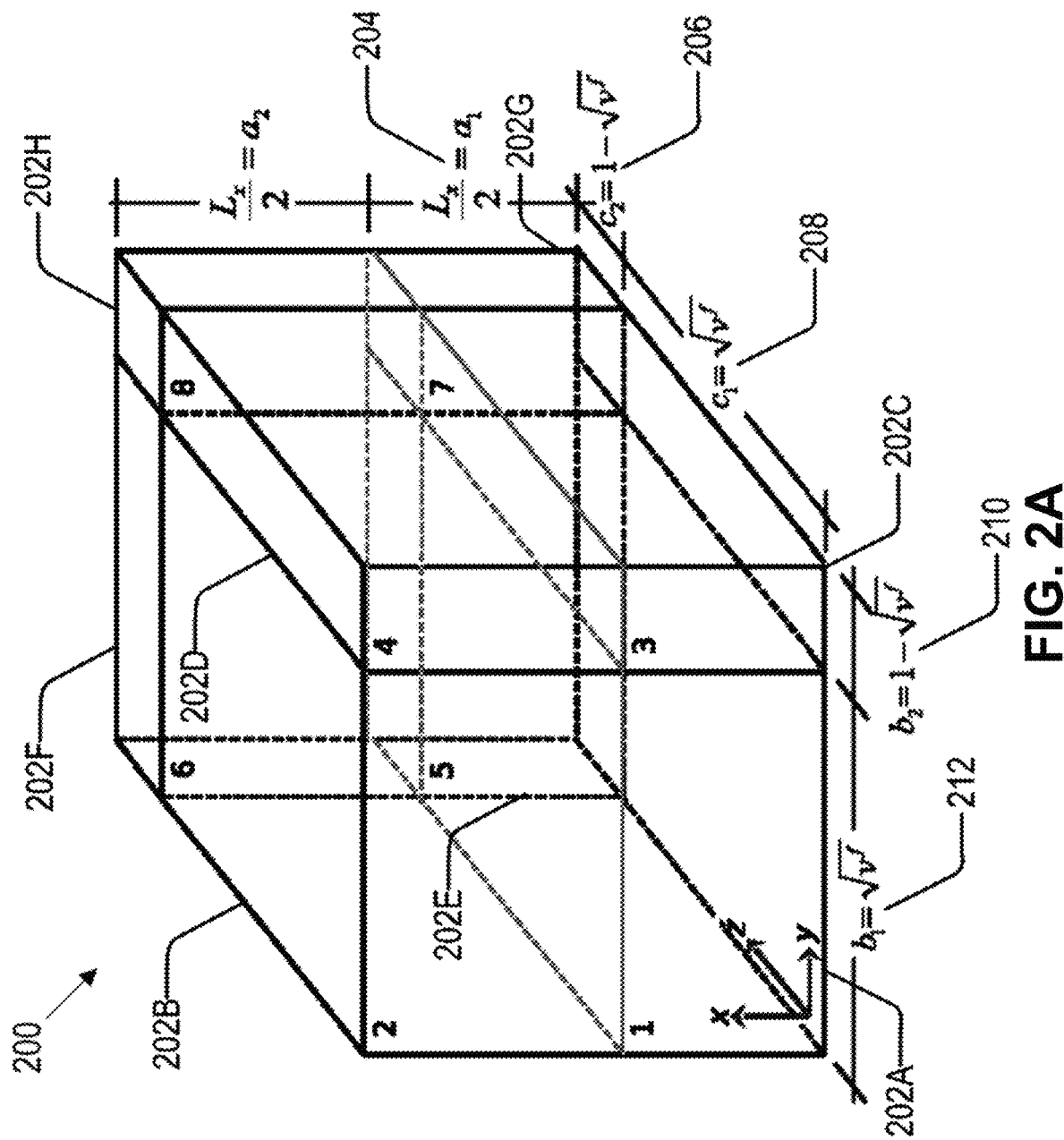
FIG. 2A shows a unit-cell model for modeling fibrous composites.

This description begins with the explanation of the multi-scale model and its computational foundations that is described in view of FIGS. 1 and 2A. Also necessary to this discussion is understanding the shortcomings of the theory—where its representation of reality is questionable—most importantly so they can be mitigated and the range of applicability of the theory understood.

Figure 2B:
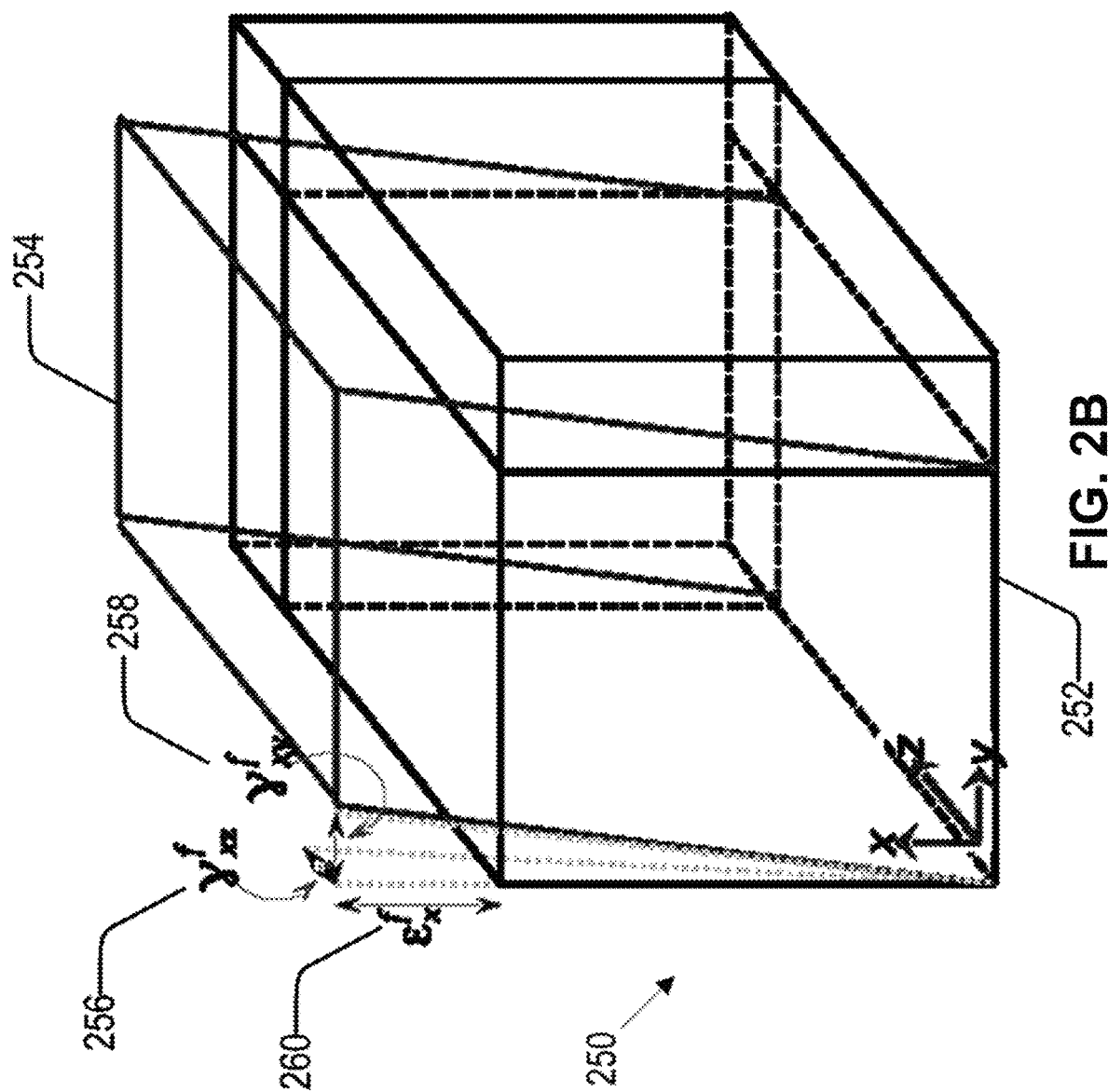
FIG. 2B shows a unit cell with an elongated 1-2 quarter-cell.

Following the definition of the Multi-scale Cellular model, the failure model for fibrous composites based on the elements of the multi-scale model is described with respect to FIG. 2B. Initial damage is then expanded so that individual failure of a lamina can contribute to the progressive damage of a multilayer, multi-angle laminate.

In order to increase the utility of the failure model based on multi-scale modeling, the multi-scale model, the failure initiation criteria as well as the damage progression model is then implemented in, for example, Fortran code suitable for use in most finite element solvers (3DS's Abaqus in this example). This damage initiation and progressive damage is described with respect to FIG. 3. The Fortran implementation was tested against five sets of WWFE data as well as three different sets of experiments.

Figure 4:
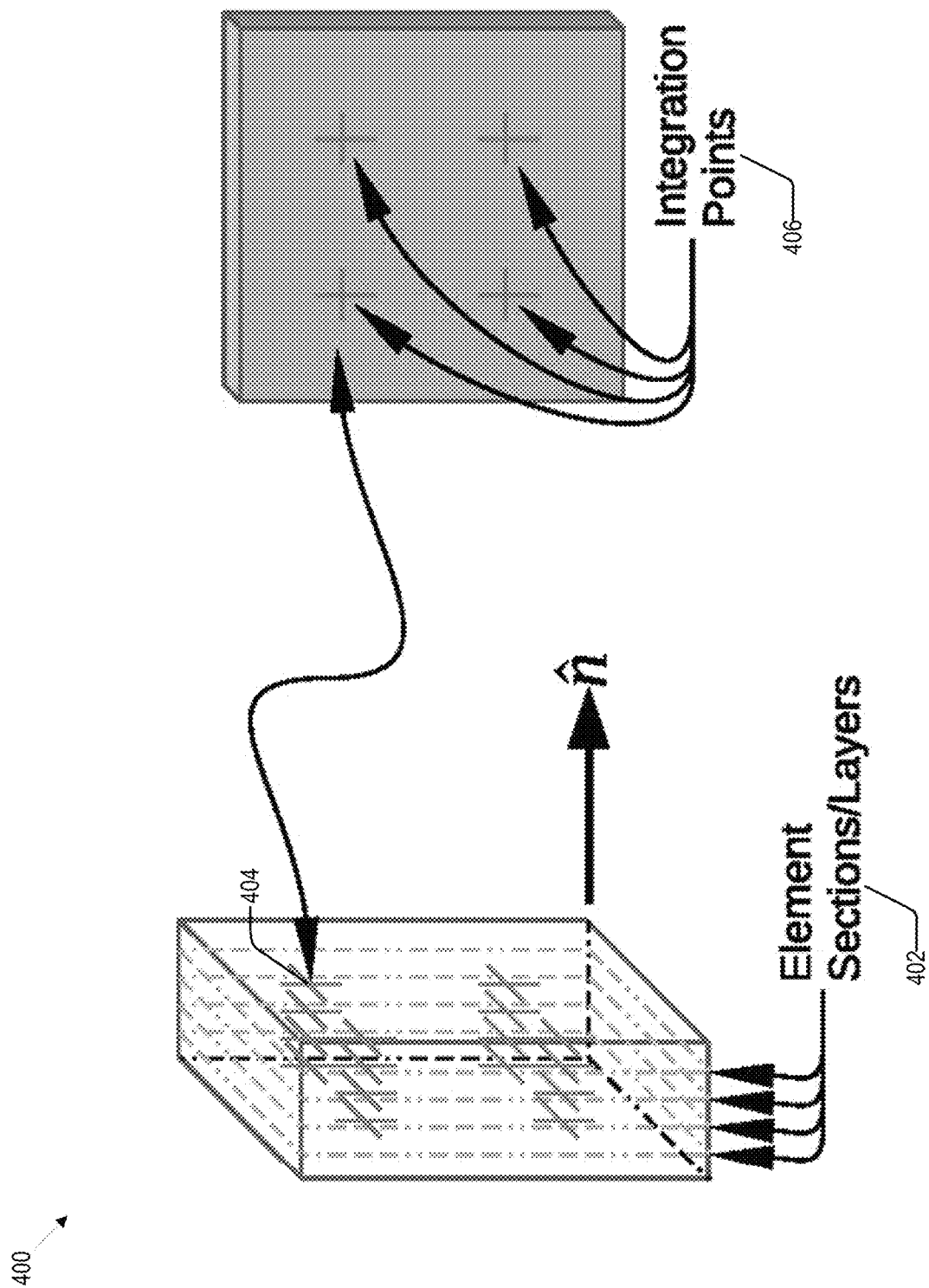
FIG. 4 shows the relationships between sections and integration points.
Figure 5:
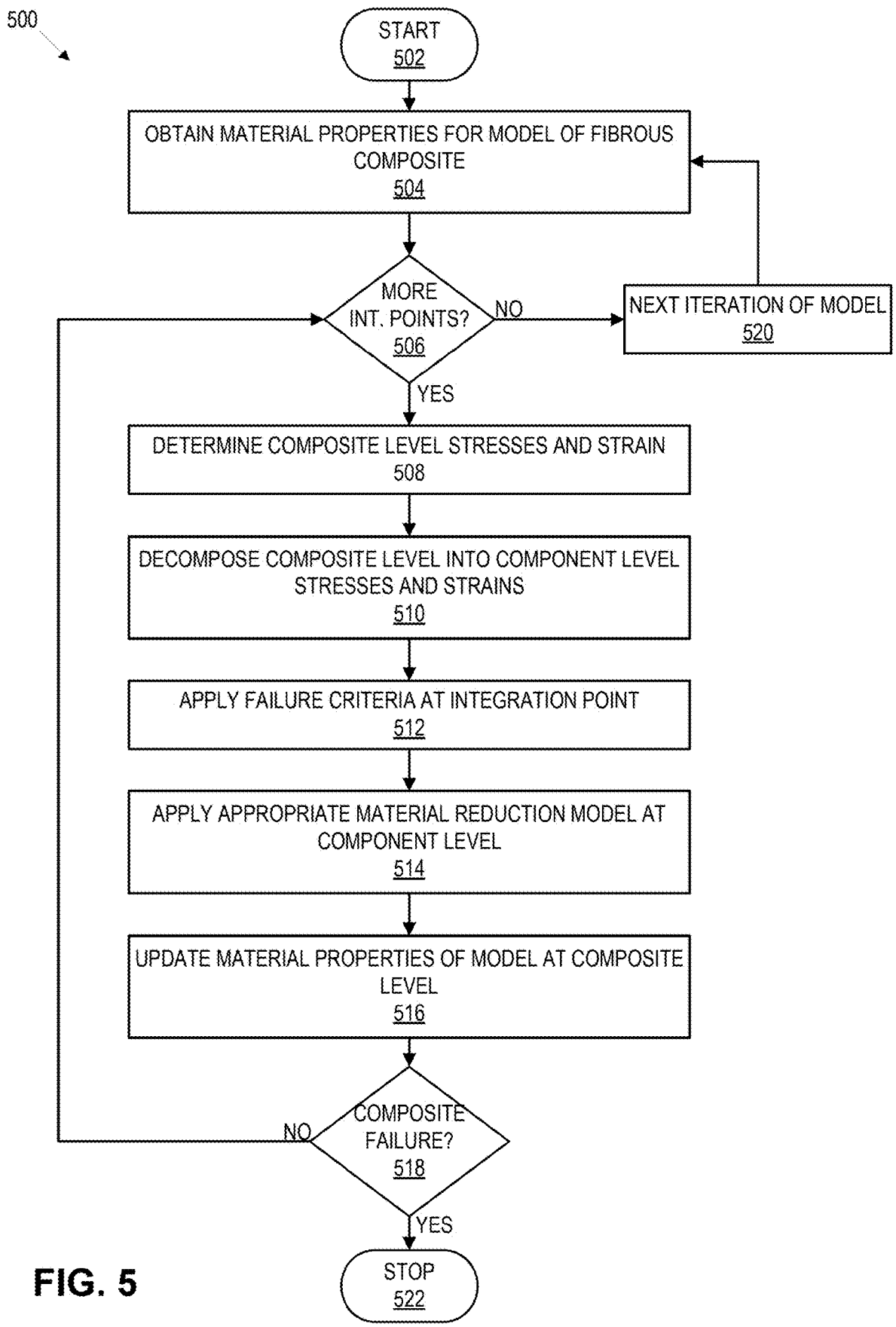
FIG. 5 illustrates a workflow for modeling fibrous composites.

Lastly, the multi-scale model is then explored through a parametric analysis of the inputs of the method: constituent modulus, fiber volume fraction, temperature variations, and small angle perturbations, which are described in view of FIGS. 4 and 5.

FIG. 1 illustrates a schematic diagram of multiscale coupling 100. Multiscale modeling 100 of a fibrous composite relates the material properties, stresses and strains at the lamina level (called macro-level) 106 to those at the constituent material level (called micro-level) 102. Both levels are connected bi-directionally (up-scale 106 and down-scale 110) through the unit-cell model 104.

FIG. 2A shows a unit-cell model 200 for the representative composite strand has eight subcells 202A-202H. For a fibrous composite, only four subcells are strictly necessary. However, the model to be described was developed not only for the fibrous composite but also for particulate and whisker composites, and is unmodified in this discussion to retain its flexibility. As a result, the unit-cell model 200 used here has eight subcells 202A-202H. Material properties are assigned to each subcell 202A-202H. The assignment of properties and the relative sizes of the subcells 202A-202H are based on the constituents' material properties and the fiber volume fraction. For instance, a fibrous composite would be represented by fiber properties (moduli, volume fraction, coefficients of thermal expansion, Poisson's ratio, etc.) assigned to subcells 1 202A and 2 202B, while the matrix properties are assigned to the remaining subcells 202C-202H. In addition, inclusions, voids and alternative materials as well as different cellular aspect ratios can also be modeled.

For this description, the following terms are defined:

Strand: the entire unit cell 200 containing connected fiber and matrix portions; the strand is the macro-level composite Subcell (202A-202H): the lowest division of the composite unit cell 200, one of eight rectangular prisms with assigned material properties; stresses and strains assigned to a subcell are denoted by, for example, $\sigma^1_x$ and $\varepsilon^3_z$ indicating x-directional normal stress in the 1st subcell 202A and z-directional normal strain in the 3rd subcell 202C, respectively Quarter-cell: the combination of two subcells in a particular direction; for instance, a fibrous composite assigns fiber properties to subcells 1 202A and 2 202B, therefore the fiber lies in the 1-2 quarter-cell 202A-B; stresses and strains are denoted similarly to subcells; a second superscript indicates the included subcell such as $\sigma^{12}_x$ indicating the fiber-directional stress in the 1-2 202A-B quarter-cell Half-cell: similar to the quarter-cell, describing a whole side of the unit cell; stresses in this case are denoted with the addition of superscripts: $\sigma^{3478}_z$ which represents the z-directional stress in the 3-4-7-8 202C-D, 202G-H half-cell Upscale: to use constituent mechanical properties in order to predict composite macro properties Downscale: to decompose the macro level strains of a composite into stresses and strains in each of the subcells in the unit cell In this description, the coordinates are described as below:

x—the longitudinal fiber direction y—the first transverse direction, starting in the 1-2 quarter-cell 202A-B, with the direction toward the 3-4 quarter-cell 202C-D; the y-direction is always used as the in-plane direction z—the second transverse direction, starting in the 1-2 quarter-cell 202A-B, with the direction toward the 5-6 quarter-cell 202E-F; the z-direction is always used as the out-of-plane or thickness direction The strand description starts with the geometrical relationships of the unit cell 200 and the subcells 202A-202H that comprise it. In FIG. 2A, the total dimension on each side is taken as unity. The fiber is described as assuming the entire first 202A and second 202B subcells (the full x length of the subcell). Matrix material is assigned to the third 202C through eighth 202H subcell, also filling the entire x direction of the unit cell 200. In the y and z directions, the fiber-to-matrix ratio or volume fraction ($v_f$) control the dimensions of the subcells 202A-202H. For example, the unit cell length in the y direction is the sum of the fiber subcell y dimension 212 and the 34 quarter-cell y dimension 210.

As proposed in Kwon and Berner, Micromechanics model for damage . . . , Engineering Fracture Mechanics, Vol. 52, No. 2, pp. 231-242, Sep. 1995, the subcells are joined together by requiring normal stress continuity between adjacent subcells 202A-202H as stated below:

$$\sigma_x^1 = \sigma_x^2, \sigma_x^3 = \sigma_x^4, \sigma_x^5 = \sigma_x^6, \sigma_x^7 = \sigma_x^8 \tag{1}$$

$$\sigma_y^{12} = \sigma_y^{34}, \sigma_y^{56} = \sigma_y^{78} \tag{2}$$

$$\sigma_z^{12} = \sigma_z^{56}, \sigma_z^{34} = \sigma_z^{78} \tag{3}$$

Shear-stress continuity between subcells 202A-202H adjacent in the shear stress direction is expressed:

$$\tau_{xy}^{12} = \tau_{xy}^{34}, \tau_{xy}^{56} = \tau_{xy}^{78} \quad (4)$$

$$\tau_{xz}^{12} = \tau_{xz}^{56}, \tau_{xz}^{23} = \tau_{xz}^{78} \quad (5)$$

$$\tau_{xz}^{12} = \tau_{xz}^{12}, \tau_{xz}^{12} = \tau_{xz}^{12} \quad (6)$$

Compatibility of normal and shear strains between each half-cell is expressed:

$$\varepsilon_x^{12} = \varepsilon_x^{34} = \varepsilon_x^{56} = \varepsilon_x^{78} \quad (7)$$

$$b_1 \varepsilon_y^{12} + b_2 \varepsilon_y^{34} = b_1 \varepsilon_y^{56} + b_2 \varepsilon_y^{78} \quad (8)$$

$$c_1 \varepsilon_z^{12} + c_2 \varepsilon_z^{56} = c_1 \varepsilon_z^{34} + c_2 \varepsilon_z^{78} \quad (9)$$

$$\gamma_{xy}^{1234} = \gamma_{xy}^{5678} \quad (10)$$

$$\gamma_{xz}^{1256} = \gamma_{xz}^{3478} \quad (11)$$

$$\gamma_{yz}^{1357} = \gamma_{yz}^{2468} \quad (12)$$

Where $$\gamma_{xy}^{1234} = \gamma_{xy}^{12}(a_1+a_2)b_1 + \gamma_{xy}^{34}(a_1+a_2)b_2 \quad (13)$$

$$\gamma_{xy}^{5678} = \gamma_{xy}^{56}(a_1+a_2)b_1 + \gamma_{xy}^{78}(a_1+a_2)b_2 \quad (14)$$

$$\gamma_{xz}^{1256} = \gamma_{xz}^{12}(a_1+a_2)c_1 + \gamma_{xz}^{56}(a_1+a_2)c_2 \quad (15)$$

$$\gamma_{xz}^{3478} = \gamma_{xz}^{34}(a_1+a_2)c_1 + \gamma_{xz}^{78}(a_1+a_2)c_2 \quad (16)$$

$$\gamma_{yz}^{1357} = \gamma_{yz}^{15}(c_1+c_2)b_1 + \gamma_{yz}^{37}(c_1+c_2)b_2 \quad (17)$$

$$\gamma_{yz}^{2468} = \gamma_{yz}^{26}(c_1+c_2)b_1 + \gamma_{yz}^{48}(c_1+c_2)b_2 \quad (18)$$

The last required connection is the consideration that the total strain is the volume-averaged sum of the subcell strains. The relationships above are described as $$\bar{\varepsilon}_{ij} = \sum_{n=1}^{8} V^n \varepsilon_{ij}^n \quad (19)$$

where $\bar{\varepsilon}_{ij}$ is the ij-th strain component of the composite, $V^n$ is the volume of the n-th subcell, and $\varepsilon_{ij}$ is the ij-th strain component of the n-th subcell. The same expression can be also written for the stress components like $$\bar{\sigma}_{ij} = \sum_{n=1}^{8} V^n \sigma_{ij}^n \quad (20)$$

This system of equations allows for the volume-averaged combination of the properties of the constituents yielding a global or macro-scale set of properties of the composite. Once the macro-scale properties are established, a macro-scale compliance matrix can be simply employed to calculate the macro-scale strains to applied stresses. The finite element method can be also utilized to analyze a complex shape of composite structure subjected to the applied loading in order to compute the macro-scale stresses and strains. The unit-cell model determines the stresses and strain at every subcell from these macro-scale strains. Thermal effects can also be included in this model.

As shown in Kwon and Park, the model's performance for the prediction of macro properties of a composite, knowing only the properties of the constituents, is very satisfactory. The upscale and downscale routines are simple routines that can be implemented in any numerical software package in 500 or so lines (much fewer with efficient coding). The relationships between the subcells are simple and intuitive.

An additional strength of the theory is that the degraded properties of a lamina can be calculated before the analysis. The global-to-subcell (downscale) transformation relationships and composite-level constitutive relationships for each type of failure (and all combinations of failures) can be formed from the constituent properties in the first iteration and stored as reference values, allowing the subroutine to avoid matrix inversions and decompositions unrelated to solving the finite element problem, potentially significantly speeding up the subroutine performance.

The theory, while simple in its formulation and implementation, does have some drawbacks. The routines rely on some data that may not be readily available, specifically, transverse moduli and Poisson's ratio of fibers and shear modulus of fibers. These values may not be readily available from manufacturers or experimentalists. However, reasonable guesses for unknown properties can be made without significant impact to the output of the method. Also, as will be shown, the method itself can be used to estimate unknown properties from global values and known properties.

The formulation does not include shear coupling, that is: normal stresses on the composite only result in normal strains. Furthermore, the theory allows for strain discontinuities in the y and z directions between quarter-cells as well as shear-strain discontinuity between half-cells.

In a unit cell 200, the total shearing strain for both half-cells 202A-B, 202E-F and 202C-D, 202G-H equals the macro-level shearing strain; however, adjacent quarter-cells (1-2 202A-B and 5-6 202E-F, 3-4 202C-D and 7-8 202G-H) are allowed to have incompatible shear strains. This is of important consequence, since the calculation regarding maximum principal strain relies on the shear strain value. This allowed discontinuity is likely only an artifact of the model, and will negatively impact any failure calculations based on these strains. An adjustment for this discontinuity is discussed below with respect to FIG. 2B and as will be shown, provides a convenient ability to tune a failure envelope such that it provides a failure range from conservative to aggressive.

To determine the material properties of the composites, the material properties of the constituents must be known. The multiscale model, comprised of continuous fibers and matrix material, requires the input of the material properties of first the fiber, the composite and some details of the composite itself. Most of the material properties that are of concern can be found in literature provided from a material's manufacturer. In some cases, the relevant material properties are difficult to locate, are not provided, or are difficult or impractical to measure. In such cases, estimates for these properties adapted from similar materials can be used or the properties can be estimated using known properties of the constituents and composite. These estimates can be accomplished with the multiscale model's upscale and downscale routines discussed below.

The fiber, in most cases, is the main strength member for the composite. It usually consumes the majority of the volume of the composite and accounts for at least 90% of the modulus of the composite. The multiscale model requires the input of the following properties in order to complete both the upscaling (homogenizing) and downscaling calculations:

1. $E_x^f$—Longitudinal Young's Modulus
2. $E_y^f$—Transverse Young's Modulus
3. $v_{xy}^f, v_{yz}^f$—Longitudinal and Transverse Poisson's Ratio 4. $G^f_{xy}$—Shear Modulus
5. $v^f$—fiber volume fraction
6. $\alpha^f_x$—Coefficient of thermal expansion for fiber in longitudinal direction
7. $\alpha^f_y$—coefficients of thermal expansion (CTE) of fiber in transverse direction As discussed, some of these inputs are not easily obtained. Transverse Young's modulus ($E^f_y$), Poisson's ratios ($v^f_{xy}$, $v^f_{yz}$), shear modulus ($G^f_{xy}$) and coefficients of thermal expansion ($\alpha^f_x$, $\alpha^f_y$) are infrequently reported by manufacturers or are difficult to establish. However, reasonable estimates for these inputs can be used for preliminary modeling. The WWFE provided this data for its participants; however, for the designer and researcher, this same WWFE data can be a starting point for comparable materials. The composite and constituent data provided by the WWFE was used in this implementation.

The matrix material provides the composite that which the fiber material cannot: transverse and shear stiffness as well as support in compression loading. The multiscale model requires fewer properties of the matrix material since the matrix is considered homogeneous and isotropic. The properties required are:
1. $E_m$—Young's modulus of matrix (assumed isotropic)
2. $v_m$—Poission's ratio (assumed isotropic)
3. $\alpha^m$—CTE for matrix The matrix material properties are usually more available than those of the fiber material. Most of the needed properties are available from resin manufacturers or can be obtained experimentally. Again, for the majority of test cases in this implementation, the WWFE data was comprehensive and included all required values.

Many methods have been proposed to estimate macro composite properties from the properties of the constituents. Finite element models of representational volume elements can be used to homogenize the constituents to predict macro properties. The multiscale method can be used to predict macro properties.

The prediction methods rely on the documented properties of composites, found from manufacturers, academia, and reference texts. In addition to the data found in these sources, the estimation methods may also rely on data that is difficult to obtain. The usually unknown properties are:
1. $E^f_y$—The transverse elastic modulus of the fibrous portion of the composite
2. $v^f_{yz}$—The transverse Poisson's ratio of the fibrous portion of the composite
3. $G^f_{xy}$—The shear modulus of the fibrous portion of the composite These properties, and some of the better-known properties that are not available, can sometimes be assumed to be the same as their orthogonal counterparts by assuming that the material is isotropic. For carbon fiber, however, this is a poor representation because the experimentally measured transverse elastic modulus was 6% of the longitudinal modulus. Therefore, for carbon fibers it may be best suited to take the transverse elastic modulus of carbon fibers as 10% of their longitudinal values.

To estimate other unknown properties, the multiscale method can be combined with an optimizer that uses known properties of both the constituents and the composite to tune initial guesses provided by the user. Preliminary work was done forming a nonlinear optimizer that uses the known composite properties as targets and all function inputs as parameters. The optimizer uses the objective function:

$$\underset{x_i}{\text{minimize}} \sum_{i=1}^{8} |1 - x_i|$$

subject to $0.25 \leq x_i \leq 2$, $i = 1, \ldots, 8$

[outputs] = upscale_function(inputs)

$E^s_x = E^{given}_x$ $E^s_y = E^{given}_y$ $v^s_{xy} = v^{given}_{xy}$

*Other constraints

The optimizer changes the multiples ($x_i$) of one or many of the upscaling function inputs (the constituent materials' properties) and penalizes departures from unity on these multiples.

An additional use of this optimizer is tuning the values of selected constituent properties such that the upscaled material properties exactly reproduce those measured experimentally. Using an optimizer in this way also allows for a cross-property adjusting while preventing major departures from the stated constituent values. This simple routine can be implemented in programs like Excel, MATLAB or more advanced solvers. Further adjustments can be made to this routine to refine its method. Also, additional weights can be added to the objective such that changes to certain input parameters are "penalized" more than other changes.

Some additional work was done to determine the sensitivity of the forward function outputs to the material property inputs. The results are summarized in TABLE 1. TABLE 1 represents the change of the output variable (the major columns) due to a −10% change (the left minor column) and a +10% change (the right minor column) in the input variables (the rows). Both positive and negative changes are shown so that it can be determined whether the sensitivity is in general linear or not, and the general response direction of the output variable.

TABLE 1

| | $E_1$ | | $E_2$ | | $E_3$ | | $G_1$ | | $G_2$ | | $G_3$ | | $v_{12}$ | | $v_{23}$ | |
|---|---|---|---|---|---|---|---|---|---|---|---|---|---|---|---|---|
| efl | −9.88 | 9.88 | −0.05 | 0.04 | −0.05 | 0.04 | — | — | — | — | — | — | — | — | −0.18 | 0.15 |
| eft | — | — | −5.42 | 4.99 | −5.42 | 4.99 | — | — | −2.86 | 2.47 | — | — | 0.10 | −0.08 | 0.78 | −0.76 |
| nuf12 | — | — | 0.03 | −0.03 | 0.03 | −0.03 | — | — | — | — | — | — | −5.33 | 5.33 | 0.11 | −0.11 |
| nuf23 | — | — | 0.26 | −0.25 | 0.26 | −0.25 | — | — | 0.55 | −0.54 | — | — | 0.03 | −0.03 | −3.16 | 3.14 |
| em | −0.12 | 0.12 | −4.98 | 4.56 | −4.98 | 4.56 | −9.46 | 9.35 | −7.55 | 7.16 | −9.46 | 9.35 | −0.09 | 0.09 | −0.68 | 0.55 |
| num | — | — | −3.73 | 4.89 | −3.73 | 4.89 | 2.58 | −2.45 | 2.00 | −1.93 | 2.58 | −2.45 | −4.91 | 5.21 | −11.75 | 13.91 |
| vf | −9.69 | 9.69 | −7.23 | 7.66 | −7.23 | 7.66 | −15.65 | 20.74 | −7.49 | 8.81 | −15.68 | 20.74 | 2.07 | −2.05 | 5.56 | −5.44 |
| gf12 | — | — | — | — | — | — | −0.66 | 0.55 | — | — | −0.66 | 0.55 | — | — | — | — |

As seen in TABLE 1, the volume fraction, when changed by itself, has the largest effect on all output variables. While this variable has the most cross-output effect, it is usually one of the best known inputs into the model, reducing its variability. As expected, the fiber properties dominated the fiber-direction modulus, and the perpendicular modulus was relatively evenly split between the fiber transverse modulus and the matrix modulus. This table gives a general map as to what properties to adjust to dial in the mathematical model's property estimates to experimentally observed properties.

Additionally, in the general range of ±10%, most of the output responses were generally linear (or can be approximated as linear); however, for larger changes, some of the responses were nonlinear, emphasizing the need to have relatively good estimates of the unknown properties of the constituents before using the simple optimizer above.

In order to implement the multiscale model in both upscale and downscale directions, the relationship matrix, T, is formed as a 24×24 matrix. This relationship matrix uses Equations 1 through 3, 7 through 9 and Equation 19. These equations represent that the total strain of the strand is the sum of the strains contained in the strand, and that the strain is also volume-averaged strain.

The relationship matrix T is composed of three sub-matrices $[[T_1][T_2][T_3]]^T$. The first portion, $T_1$, forms the relationships between global stress and subcell stress. The first four rows of $T_1$ expresses Equations 1. Similarly, the remaining eight rows reflect normal stresses in the y and z (Equations 2 and 3). To demonstrate, the fifth row relates the strains between the 12 quarter-cell 202A-B and the 34 quarter-cell 202C-D in the y direction. The linear system is thus:

$$[c_{yx}^f \quad -c_{yx}^m \quad \ldots \quad c_{yy}^f \quad -c_{yy}^m \quad \ldots \quad c_{yz}^f \quad -c_{yz}^m \quad \ldots ] \quad (21)$$

$$[\varepsilon_x^{12} \quad \varepsilon_x^{34} \quad \ldots \quad \varepsilon_y^{12} \quad \varepsilon_y^{34} \quad \ldots \quad \varepsilon_z^{12} \quad \varepsilon_z^{34} \quad \ldots ]^T = 0$$

where the entries like $c_{nm}^f$ are the (n, m) entry in the fiber component subcell stiffness matrix, and likewise for the matrix material subcell stiffness matrix.

Submatrix $T_2$ establishes the normal strain relationships—that the directional strain of the strand is equal between each half-cell, and that the strain in each half-cell is the weighted sum of the strains of each quarter-cell (Equations 7 through 9). Submatrix $T_3$ parses Equation 19, establishing that the global directional strain is the sum of the volume-weighted subcell strains.

Once T is formed, it is partially inverted to obtain the 24×3 R matrix which allows the volume-averaged and stress-equating distribution of global normal strains ($\varepsilon_s$) to subcell normal strains ($\varepsilon_s$) by multiplying $R\varepsilon^s = \varepsilon^c$. Only the last three columns of R are for non-zero equations, so R is obtained by solving the linear system TR={$e_{22}$ $e_{23}$ $e_{24}$}, where $e_n$ are the 22nd through 24th unit vectors.

To establish the upscaling, a combined stiffness matrix (24×24) is formed and multiplied by the downscaling matrix R to obtain the 24×3 distributed stiffness matrix. The directional stiffnesses are then linearly combined and weighted by the relative volumes of the subcells. This yields a 3×3 normal stiffness matrix for the material. To obtain the upscaled values for directional moduli and Poisson ratio, this matrix can be inverted and the values extracted, where the diagonals are the inverse of the upscaled composite directional stiffnesses, and the off diagonals are these values with the composite Poisson ratios in the numerator.

To calculate the upscaled shear moduli, Equations 13 through 18 are used. The shear modulus of each half-cell is estimated by combining its quarter-cell's shear moduli, weighted by the quarter-cell cross-sectional area (length and width) in the plane of interest (Equations 22 and 23). These values are then combined across the half-cells by applying the half-cell dimension in depth as the weighting factor. For instance, the shear modulus of the unit cell in the x-y plane is calculated:

$$G_{xy}^{1234} = \frac{1}{ab_1 / G_{xy}^f + ab_2 / G_{xy}^m} \quad (22)$$

$$G_{xy}^{5678} = \frac{1}{ab_1 / G_{xy}^m + ab_2 / G_{xy}^m} \quad (23)$$

$$G_{xy}^s = c_1 G_{xy}^{1234} + c_2 G_{xy}^{5678} \quad (24)$$

where a, $b_n$, $c_n$ are the dimensions from FIG. 2A and $a = a_1 + a_2$.

To summarize the above, the micro-mechanical model for fiber composites are described, as well as some of its benefits and shortcomings. Additionally, the inputs to the method—namely the properties of the constituents—were described. For properties that are either unknown or less-well defined like the transverse modulus of a fiber phase, estimating methods and optimization routines were proposed. The sensitivity of the outputs of the upscaling routine are also explored in order to target the most effective alterations to input properties to better represent macro-level properties. Lastly, the mechanics of the calculation of the upscaling method are explained. With the upscaling and associated downscaling methods defined, the material properties and response under load, both macro and micro, can be predicted.

Composite materials have been applied to many load-carrying structures and gradually replaced metals in structures and devices. This ubiquity makes accurate predictions of failure strengths of composites essential. The multi-phase, inhomogeneous and anisotropic nature of composite materials lies at the heart of the complexity of accurate failure prediction.

The failure criteria proposed below uses stresses and strains exhibited in the constituent materials such as fiber and matrix materials as described in the following sections. The criteria were developed to describe physics-based modes of failure at the micro-scale level. The failure modes are fiber breakage, fiber buckling, matrix cracking, and fiber/matrix interface debonding. The proposed criteria are evaluated against available experimental data as given in the World-Wide Failure Exercise data.

As discussed previously, many of the existing failure theories are based on the use of the test data of a lamina. This theory currently requires the use of constituent materials' strength data. If some of those data are not available, they can be derived from the lamina level test data. The failure envelope of a composite is defined as the locus of points of each failure mode. The following failure criteria are similar to the Hashin separate mode criteria, but is distinct from Hashin in its use of the micro-mechanics model as its basis and its use of strain rather than stresses.

This criterion is applicable for fiber under tensile loading. This failure mode is called fiber breakage. Once the fiber subcell's resultant strain reaches the failure strain of the fiber, the fiber is considered failed based on the following criterion:

$$\frac{\sqrt{(\varepsilon_x^{12})^2 + (\gamma_{xy}^{12})^2 + (\gamma_{xz}^{12})^2}}{\varepsilon_{u,t}^f} \geq 1 \quad (25)$$

This failure criterion takes shear angle into account so that the elongation of the fiber is not only the longitudinal lengthening of the fiber subcell, but also the imposed shear angle, as shown in FIG. 2B. FIG. 2B shows a unit cell 252 with an elongated 1-2 quarter-cell 254. The shearing angle may not initially appear important, but it becomes significant for larger shearing stress on top of the longitudinal stress.

The data required to implement this criterion is the fiber elongation at failure, $\varepsilon_{u,t}^f$, which is commonly available information. While using this value in the failure model yields results within 4% of the stated composite value, the micro-mechanics model can also be used to adjust this quantity so as to exactly match the macro-level anchor point. To do this, the macro failure stress is applied to the unit strand and the fiber failure strain is calculated using the downscaling routine. This can be useful since the fiber elongation at failure may provide an over-prediction of the stated longitudinal strength of the composite.

This formulation of the fiber breakage criteria is unique since other criteria that separate the modes of composite failure are primarily stress-based. Due to the ability to extract both the normal and shear strain of the fiber phase of the composite through the multiscale method, the failure strain of the constituent can be used directly rather than rely on the macro-level failure values.

The second criterion is for fiber failure while under compression. It is called fiber buckling, and the criterion is defined as $$\frac{\sqrt{(\varepsilon_x^{12})^2 + (\gamma_{xy}^{12})^2 + (\gamma_{xz}^{12})^2}}{\varepsilon_{u,c}^f} \geq 1 \quad (26)$$

where $\varepsilon_{u,c}^f$ is the fiber (and composite) longitudinal strain at the stated ultimate compressive stress as calculated by $$\varepsilon_{u,c}^f = \frac{\sigma_u^C}{E_x^C},$$

in which the superscript C indicates composite (macro-scale) values. Since this value is derived from the macro failure stress through the micro-scale model, it requires no adjustment like the fiber breakage criterion.

One of the most important portions of this failure criteria is the debonding of the fiber/matrix interface between the fiber and matrix phases. The simplest form of this criterion describes the failure of the interface when the transverse normal stress between the fiber subcell and its adjacent matrix subcell reach a critical value. As stated, this criterion would simply be a maximum shear stress criteria applied at the subcell level:

$$\frac{|\tau_{xy}^{34}|}{\tau_u} \geq 1 \quad (27)$$

where $\tau_u$ is the in-plane failure shear of the composite. This, as will be shown later, is an incomplete picture, since longitudinal tensile stresses appear to delay shear failure and transverse tensile stresses appear to promote shear failure. This requires that there be some additional terms in the shear failure portion to account for the promotion or delay of the onset of shear failure in a composite sample. Empirical data will be used to determine which outputs of the multiscale method are best suited as terms in the failure criteria.

To understand the response of the subcells reported by the multiscale method as load progressed through the normal-shear space, a hemielliptical path through each of the normal-shear planes was chosen. These paths are meant to provide controlled, prior-to-failure input of loads to the multiscale downscale routine in order to plot the output. The paths were defined by the stated failure points of the composite ($\sigma_{x,T}$, $\sigma_{x,C}$, $\sigma_{y,T}$, $\sigma_{y,C}$, and $\tau_{xy,U}$) as the semimajor and semiminor radii. For this illustration, the properties of a T300-BSL914C were used. The paths were defined by:

$$\left(\frac{\sigma_x}{1\times 10^9}\right)^2 + \left(\frac{\tau_{xy}}{8\times 10^7}\right)^2 = 1$$

for the $\sigma_x$–$\tau_{xy}$ subspace and $$\left(\frac{\sigma_y}{4\times 10^9}\right)^2 + \left(\frac{\tau_{xy}}{8\times 10^7}\right)^2 = 1$$

for the $\sigma_y$–$\tau_{xy}$ subspace.

The stress values are calculated in the micro-model as the micro-model is swept through these paths. The shear stress between the 12 and 34 quarter-cells from the applied stress as well as both the x and y stresses in the 34 quarter-cell, $\tau_{xy}^{34}$, $\sigma_x^{34}$, and $\sigma_y^{34}$, are determined.

In the $\sigma_y$–$\tau_{xy}$ subspace, the calculated $\sigma_x$ and $\sigma_y$ subcell stresses in the 34 quarter-cell are two and four orders of magnitude, respectively, less than the applied longitudinal load. This is reasonable, since the fiber is the major load-carrying component. Alternatively, in the σy-τxy subspace, the calculated σx and σy subcell stresses are both the same order of magnitude and same sign as the applied transverse normal stress.

For the $\sigma_x$–$\tau_{xy}$ plane, empirical data implies that ultimate failure is delayed with tensile $\sigma_x$ and promoted with compressive $\sigma_x$, the calculated $\sigma_x^{34}$ can be used to diminish $\tau_{xy}^{34}$. The impact that $\sigma_x^{34}$ has on the criteria can be controlled using a scaling factor $\alpha_1$. The first alteration to Equation 27 becomes:

$$\frac{\tau_{xy}^{34} - \alpha_1 \sigma_x^{34}}{\tau_u} \geq 1 \quad (28)$$

For the $\sigma_y$–$T_{xy}$ plane, observation implies that ultimate failure is promoted with tensile $\sigma_y$ and delayed with compressive $\sigma_y$, the calculated $\sigma_y^{34}$ can then be used to increase $\tau_{xy}^{34}$. Likewise, its impact can likewise be scaled with $\alpha^2$. The corresponding alteration to Equation 27 becomes:

$$\frac{\tau_{xy}^{34} + \alpha_2 \sigma_y^{34}}{\tau_u} \geq 1 \qquad (29)$$

For a complete shear picture and to enable the use of a single criterion for all of shear space, we combine Equations 28 and 29, and allow for simplicity $\alpha_1 = \alpha_2$:

$$\frac{\tau_{xy}^{34} + \alpha_1(\sigma_y^{34} - \sigma_x^{34})}{\tau_u} \geq 1 \qquad (30)$$

This form is satisfactory for the interface when it is under shear stress; however, it does not include interface debonding under pure transverse tension. It is logical to assume that debonding under transverse load will occur only under tensile transverse loading rather than compressive loading, which will likely reinforce any interaction between the fiber and matrix subcells until some other failure occurs, like matrix cracking due to the same compressive load. To include this impact, the transverse stress term is added:

$$n\frac{\sigma_y^{34}}{\sigma_\perp} \geq 1 \quad n = \begin{cases} 1 & : \sigma_y^{34} > 0 \\ 0 & : \sigma_y^{34} \leq 0 \end{cases} \qquad (31)$$

where $\sigma_\perp$ is the stated transverse failure strength of the composite.

It can be observed that bonded subcells under either longitudinal or transverse normal stresses experience some interface stresses due to the mismatch in stiffness of the two materials. The criterion includes the impact of the normal stresses on the interface shearing stress. For the complete criteria, we combine Equations 30 and 31 and allow them to interact as a quadratic polynomial. The criterion is stated as:

$$\left(\frac{\tau^I + \alpha_1(\sigma_y^{34} - \sigma_x^{34})}{\tau_u}\right)^2 + n\left(\frac{\sigma_y^{34}}{\sigma_\perp}\right)^2 \geq 1 \qquad (32)$$

and similarly for the 12-56 interface:

$$\left(\frac{\tau^I + \alpha_1(\sigma_z^{56} - \sigma_x^{56})}{\tau_u}\right)^2 + n\left(\frac{\sigma_z^{56}}{\sigma_\perp}\right)^2 \geq 1 \qquad (33)$$

where $\tau_1$ is the interface shear stress, calculated for the 34 subcell as:

$$\tau^I = \frac{\gamma_{xy}^{12} G_{xy}^f + \gamma_{xy}^{34} G_{xy}^m}{2} \qquad (34)$$

or calculated for the 56 subcell as:

$$\tau^I = \frac{\gamma_{xz}^{12} G_{xz}^f + \gamma_{xz}^{56} G_{xz}^m}{2} \qquad (35)$$

and $\alpha^1$ is the scaling factor—currently $\sqrt{v^f} - v^f$ is the fiber volume fraction, $\tau_u$ is the critical interface shear stress, and $\sigma_\perp$ is the critical interface normal stress. The impact of the shear-to-normal scaling factor, $\alpha_1$, is explored below along with the criteria's performance against experimental data.

The interface shear stress, $\tau^1$ is expressed as in Equation 34 and 35 as the average of the shear stresses in adjacent subcells. Using the portion of the downscaling routine described in Equation 24, these values should be the same; however, this averaging ensures that small variations between the two calculated shear strains are minimized. Values for $\tau_u$ can be calculated using the downscaling routine by applying the macro-level shear stress at failure to the unit strand and obtaining the interface stress between the fiber and matrix subcells. Values for $\sigma_\perp$ are adequately estimated using the uniaxial transverse failure strength.

The additional parameter, 'n', is equal to 1 when the composite is under transverse tension and zero when the composite is under transverse compression. The reason for this is to indicate that interface failure between the fiber subcell and the matrix subcell (specifically separation due to transverse normal stress) will only happen when the specimen is under transverse tension. Compressing this interface can only reinforce the connection between the subcells until the matrix reaches a crush value (i.e., failure by maximum principal strain as described below).

This formulation can take the matrix quadratic failure criterion (a matrix-specific application):

$$\left(\frac{\sigma_x^m}{X_m}\right)^2 + \left(\frac{\sigma_y^m}{Y_m}\right)^2 - \frac{\sigma_x^m \sigma_y^m}{X_m X_m} + \left(\frac{\tau_{xy}^m}{S_m}\right)^2 \geq 1$$

where X, Y, and S are the matrix failure strengths. The longitudinal term can be neglected to simplify the above to:

$$\left(\frac{\sigma_y}{Y}\right)^2 + \left(\frac{\tau xy}{S}\right)^2 \geq 1$$

Similar strengthening is observed in composite failure values while under transverse compression and shear discussed previously. Their accounting for this behavior becomes:

$$\left(\frac{\sigma_y}{Y}\right)^2 + \left(\frac{\tau xy}{S - \mu \sigma_y}\right)^2 \geq 1 \quad \mu = \begin{cases} \mu_0 & \sigma_y < 0 \\ 0 & \sigma_y \geq 0 \end{cases} \qquad (36)$$

However the criteria proposed in Equations 32 and 33 include the presumed shear interaction between the matrix subcell and the fiber subcell due to normal loading in either or both the transverse and longitudinal directions. This criterion allows for the theory to account for the lack of shear-coupling as well as the observed delay in shearing failure while under longitudinal stress and the promotion of failure while under transverse tension.

The primary reason that the normal stress terms are in the above formulation is due to the observation in the WWFE data that normal stresses either promote or delay specimen failure depending on orientation and sign. The primary thought about this interaction is that two bonded dissimilar materials undergoing the same strain will experience different stresses. For instance, the subcells undergoing longitudinal stress without bonding would all respond as independent springs and reach their own strain state that satisfies the stress state. In the case of the fiber subcell, its independent elongation would be less than the composite's elongation due to the applied stress. Conversely, the matrix subcells' independent elongation would be much greater than the composite's elongation. The two materials, however, impact one another. The fiber subcell is further elongated by the presence of the matrix subcells and the matrix subcells' elongations are moderated by the presence of the fiber. This mismatch is the likely reason for normal stresses causing interface shearing.

Matrix failure is also called matrix cracking. The failure criterion employed the maximum strain criterion, since it relies only on the calculation of the maximum principal strain experienced in each of the matrix subcells. The only complication of this criterion is the requirement to moderate the shear strain value between the fiber-matrix half-cell and the matrix-matrix half-cell. As discussed earlier, the shear strain compatibility only applies in each half-cell. The shear strain that must be used, therefore, is some combination of the calculated shear strain for the matrix portion of the fiber-matrix half-cell (worst case) or the calculated shear strain for the matrix-matrix half-cell. The compromise is the mean of the two, making the criterion:

$$\frac{\varepsilon_1^m}{\varepsilon_{u,t}^m} \geq 1 \text{ OR } \frac{\varepsilon_3^m}{\varepsilon_{u,c}^m} \geq 1 \quad (37)$$

where $\varepsilon_1^m$ and $\varepsilon_3^m$ are the principal strains of the state of strain determined from the following matrix:

$$\varepsilon^{34} = \begin{bmatrix} \varepsilon_x^{34} & \gamma_{xy}^{34} + \gamma_{xy}^{78}/4 & 0 \\ \gamma_{xy}^{34} + \gamma_{xy}^{78}/4 & \varepsilon_y^{34} & 0 \\ 0 & 0 & \varepsilon_z^{34} \end{bmatrix} \quad (38)$$

The strain tensor for the matrix subcells is formed with the off-diagonals as shown in order to overcome the discontinuity allowed discussed above with respect to FIG. 2A. It averages the shear strains calculated for the 34 and 78 quarter-cells. The impact of this averaging is discussed below along with the criteria's performance against existing data. The tensor for failure in the 56 subcell is similar in concept; however, it needs to overcome the same shortcomings in the xz plane.

$$\varepsilon^{56} = \begin{bmatrix} \varepsilon_x^{56} & 0 & \gamma_{xz}^{56} + \gamma_{xz}^{78}/4 \\ 0 & \varepsilon_y^{56} & 0 \\ \gamma_{xz}^{56} + \gamma_{xz}^{78}/4 & 0 & \varepsilon_z^{56} \end{bmatrix} \quad (39)$$

Notice that only 34 and 56 matrix failure are the only ones considered since matrix failures in 34 or 56 quarter-cells are assumed to propagate to the 78 quarter-cell. Additionally, the 78 quarter-cell is small in comparison to the other matrix cells, so failures in the 78 quarter-cell and their associated reductions in strength are small in comparison to the reductions due to a pure 34 or 56 failure. In practical terms, this failure is exhibited primarily in the transverse compression regime.

Again, this formulation is unique in that it uses the maximum principal strains of the matrix subcells rather than the global (normal) strain of the composite to determine matrix failure, enabled again by the disaggregation techniques in the multiscale method.

In addition to estimating unknown variables, as discussed above, the failure model parameters may also need to be adjusted such that the composite meets a stated or tested strength. In order to provide these data for better modeling, the multiscale method can be used to update the critical failure values. For instance, in longitudinal failure the virgin fiber's elongation at failure is used initially as the determination for longitudinal failure. Using this value may overpredict longitudinal failure stress by 5-10%. The longitudinal composite failure stress or strain as measured in experiments can be used through the multiscale method to update the failure strain of the fiber to that reported by the multiscale method with the failure stress or strain applied. To simplify this updating, a Fortran routine was written that takes as inputs the constituent parameters of the composite and the so-called failure anchor points and outputs the upscaled composite properties (homogenized moduli, etc.) as well as updated estimates for failure values such that the failure model represents the required composite anchor points.

Above, calculations made possible by the multiscale method and observation of empirical data were joined to propose novel criteria for fiber composite failure. The criteria proposed is a separate mode stress- and strain-based criteria. The fiber failure criteria as well as the matrix failure portions are unique to this method, while the interface failure portion is based on the matrix quadratic failure criterion with additions made possible by the multiscale calculations.

Described below is a progressive failure and material degradation model that would take place after the proposed criteria indicated a failure. Finally, the multiscale formulation, the failure criteria, and progressive damage model are combined into a single subroutine to be included in finite element solutions. The performance of this model for both uniaxial lamina and multi-angle laminates as well as and explorations of its inputs are also included.

With a criterion that indicates under which conditions a particular ply will fail, a method must be developed to reduce the stiffness of the failed ply in the failure direction and allow this reduced stiffness to propagate through the remainder of the structure. In order to describe this method, damage modes will be discussed as well as the logic behind particular reductions to the unit strand. The defined failure criteria is used as an indication of when material degradation in a single unidirectional ply should begin. The methodology behind the proposed strength reduction technique and its general implementation in the context of the multiscale model is then described. Finally, the damage initiation and strength reduction are applied to the strength of a laminate and the laminate's ultimate failure.

The damage modes are divided between longitudinal and transverse damage modes. Damage types characterized by these modes will be defined and the reductions that are taken as a result of those damages will be introduced. The method of tracking damage and storing and communicating this information in a solution process will be discussed. A few methods explored in this implementation that help determine "ultimate failure" of a composite sample under test will be introduced.

Described here is essentially a mode-specific progressive-softening ply-discount method, where specific failures in specific plies are reduced in stiffness following failure. Nearly any discount method can be applied using this implementation's failure theory such as ply-discount, parallel spring, and first-ply failure.

The four failure types defined by the criteria described above are the fiber elongation, interface failure, fiber buckling, and matrix failure by maximum principal strain. To determine when a composite lamina transitions from an intact to a damaged state, Equations 25, 26, 32, 33 and 37 are used as initiation quotients. When any of these quotients reach unity, the subject lamina or portion of lamina is considered failed. Post failure behavior and ultimate failure follow damage initiation indicated by the criteria described above.

Progressive failure is defined as the path of feasible failures that follow an initial failure. Feasible failures are failures that can logically take place after an initial failure. For instance, beginning with an interface failure, a matrix failure due in whole or part to transverse loading is not feasible as the matrix material is conceptually separate from transverse support; however, fiber failure following an interface failure is a feasible failure. The damage initiation quotients give a starting point for where in the loading life of a structure the properties should begin to degrade. The way in which the properties should degrade and by what quantities will be based on the conceptual model of the unit cell.

The first damage mode is that characterized by failures that would result in significant reduction in the longitudinal strength of the composite or ply in either tension or compression. Longitudinal damage is characterized by either or both of fiber failure by elongation or matrix failure by maximum principal strain in either tension or compression.

Longitudinal tensile failures reduce the longitudinal modulus of the constituent material. When fiber failure is indicated, the modulus of the fiber subcell is reduced in the present model by 99%, though this is a tunable parameter. This is likely the most consequential longitudinal failure, since the fiber subcell's modulus contributes over 90% of the modulus of the composite strand.

Matrix material failure and interface failure caused by longitudinal tension are also permitted. Matrix cracking in the longitudinal direction is handled similarly to a fiber break, reducing the contribution of the matrix material to the longitudinal stiffness of the unit strand. Longitudinal tension, when combined with transverse tension or compression or in-plane shear also may cause interface debonding, however interface failure caused by longitudinal tension would cause a smaller reduction in longitudinal modulus due only to the reduced Poisson effect that this interface provided before failure. The damage caused by the interface debonding is discussed below.

As a feasible failure, matrix longitudinal failure by cracking following interface failure must be only due to longitudinal and out-of-plane (thickness direction) strains. This is due to the presumption that a failed interface cannot sustain in-plane transverse strain, and therefore cannot transmit that strain to the matrix material subcells. In this instance, Equation 38 would be altered as:

$$\varepsilon_d^{34} = \begin{bmatrix} \varepsilon_x^{34} & 0 & \gamma_{xz}^{34} + \gamma_{xz}^{78}/4 \\ 0 & 0 & 0 \\ \gamma_{xz}^{34} + \gamma_{xz}^{78}/4 & 0 & \varepsilon_z^{34} \end{bmatrix}$$

Similar reductions would be done for interface debonding in the 56 quarter-cell.

The reduction in strength of failed fiber and/or matrix subcells is accomplished by altering the transformation matrix T, described above. Since the first submatrix $T_1$ controls the x or longitudinal properties of the composite strand, those entries are the elements that are reduced. In conjunction with the reduction in longitudinal stiffness due to a longitudinal failure, shear stiffness is also reduced in the upscaling and downscaling routines by reducing the appropriate quantities in Equations 22 and 23 and their orthogonal counterparts.

Compressive damage, mainly characterized as fiber buckling or matrix crush causes a similar reduction in subcell stiffness, and is reduced in the same manner as tensile damage. An additional consideration is a reduction in longitudinal stiffness of the fiber subcell following interface failure. This reduction considers any loss of stiffness of the fiber subcell due to the removal of that subcell's reinforcement. This reduction is again taken during the upscale/downscale matrix formation by reducing the stiffness contributions of the fiber.

Figure 3:
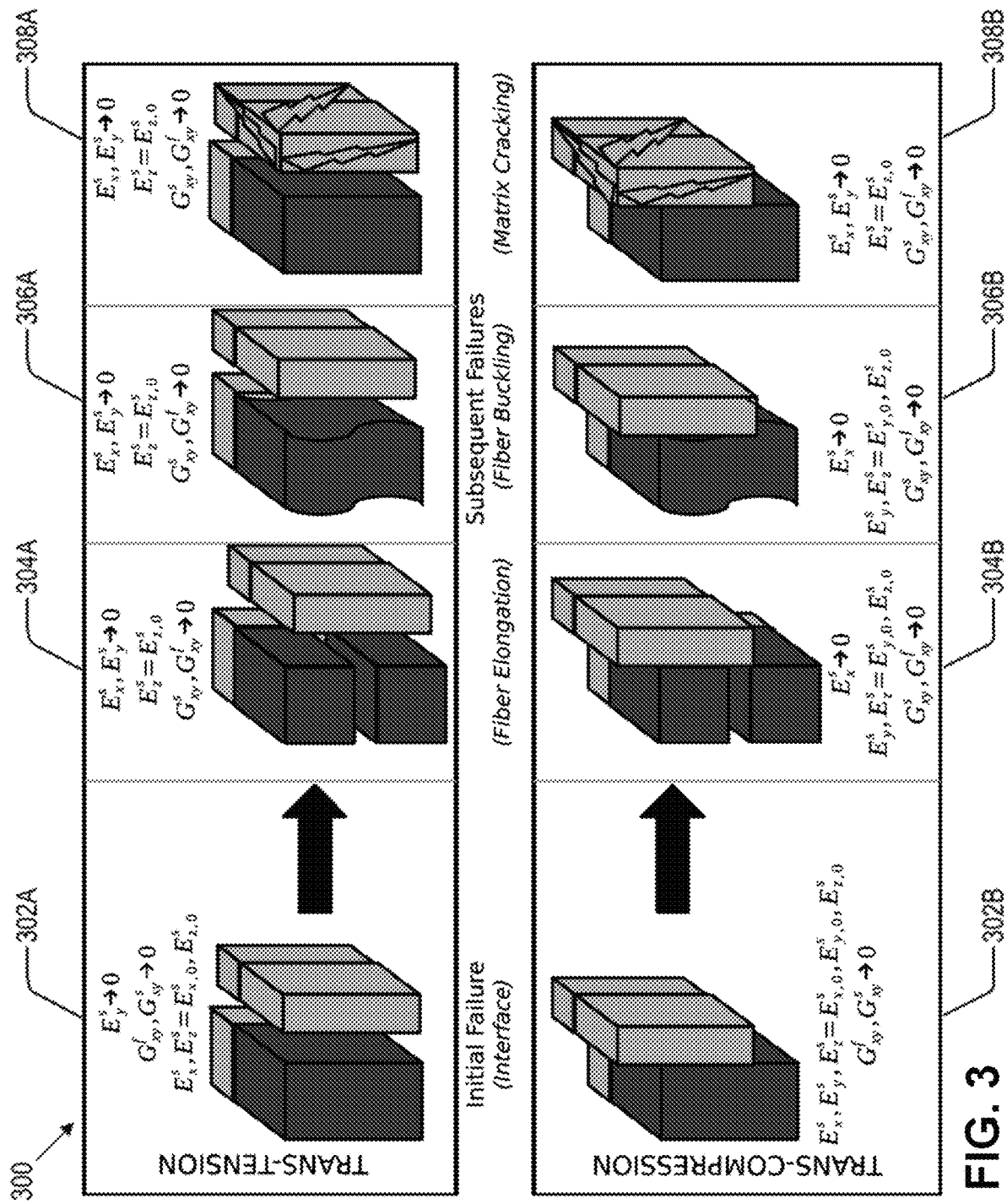
FIG. 3 shows progressive failure flow and stiffness reduction methodology.

FIG. 3 shows progressive failure flow and stiffness reduction methodology. FIG. 3 begins with interface failure 302A-B since it alone of the four failure types is considered, in the context of a laminate, a possible intermediate or non-catastrophic failure mode. If fiber failure by either elongation 304A-B—tensile fracture or buckling 306A-B—or matrix failure by compression 308A-B is indicated absent of interface failure 302A-B, these usually are associated with complete failure. However, the present model allows for the appropriate reduction in stiffness of the failed ply and the detection of additional failures.

The stiffness of the strand is initially reduced by the interface failure 302A-B, which causes the y-direction stiffness ($E_y^s$) and the shear stiffness ($G_{xy}^s$) to approach zero, while the longitudinal and z-transverse ($E_y^s$, $E_z^s$) stiffnesses remain unchanged. The shear stiffness of the fiber (1-2) subcell ($G_{xy}^f$) is also reduced, since half of the supporting matrix is no longer attached.

No additional transverse failures can occur since the stiffness in the transverse direction is very low. This, however, does not preclude longitudinal failures of the fiber or the separated matrix subcells. Following this initial failure, three types of failure are now possible: fiber elongation 304A-B, fiber buckling 306A-B and matrix cracking 308A-B. These failures cause additional reductions in the remaining stiffnesses of the strand, indicating ultimate failure of the represented ply.

Matrix failure 308A-B following interface failure 302A-B becomes more complex. The matrix can now be considered a separated homogeneous and (assumed) isotropic material under a $[\sigma_x, 0, \sigma_z, 0, \tau_{xz}, 0]^T$ state of stress. The $\sigma_y$, $\tau_{xy}$, and $\tau_{yz}$ components are all assumed to be zero since there is conceivably separation between the 3478 half-cell and the 1256 half-cell, not allowing the 3478 half-cell to sustain stress in the y direction. In this case, the matrix stiffnesses can be used to determine additional matrix failures by maximum principal strain, as discussed earlier. Also, a portion of the shear stress (strain) from the laminate (surrounding lamina) can be placed on the z faces of the 3478 half-cell.

Transverse damage is described as either 34 quarter-cell interface failure or 34 quarter-cell matrix failure as defined above. This type of failure should result in a similar reduction in stiffness for both modes, since a matrix crack or a fiber-matrix debonding mode would likely be indistinguishable or occur at the same time. To reduce the stiffness of the unit cell due to this failure, the construction of the relationship matrix t and the distributed stiffness matrix is altered. The elastic modulus of the affected subcells (34 and 78) are reduced to 1% of their initial value in the direction of failure. To apply this to the unit cell, the submatrix [$T_2$] entries related to the transverse stiffness of the 34 and 78 subcells are multiplied by the reduction factor (1%) and the upscaled stiffness matrix and the downscaling matrix R are reformed with the reduced transverse stiffnesses.

The 78 quarter-cell's properties are also reduced in this instance, since a 34 quarter-cell interface failure or matrix failure is assumed to affect the 78 quarter-cell equally. This simulates a crack that has propagated through the entire xz plane of the unit cell since it may not be reasonable to assume that a crack would initiate between the fiber 12 quarter-cell and matrix 34 quarter-cell and not propagate through the unit cell. A similar reduction is programmed for interface failure between the 56 quarter-cell and the 12 quarter-cell, and it similarly effects the 78 quarter-cell stiffness in the z direction.

In addition to transverse stiffness reduction, a transverse failure is also assumed to reduce the shear stiffness of the unit cell as the bond between the 1256 half-cell and 3478 half-cell is modeled as no longer contributing to the transverse stiffness of the unit cell. For instance, a 3478 transverse failure would provide little shearing resistance to shearing in the x-y and y-z planes. As such, the shear moduli for those cells must be reduced. To accomplish this, while forming the unit-cell shear moduli, the shear stiffnesses of the affected subcells is reduced in the failure directions by the reduction factor (again, 1% of its initial value), and recombine the subcell moduli to generate the upscaled unit cell modulus.

In the case of transverse failure, the fiber subcell in this model has lost its support in the failure plane, since the fiber-matrix bond is modeled to be either non-existent or significantly diminished. Fibers, in the absence of a matrix material, are assumed to not be able to sustain shear loading (despite one of the entries in the subroutine being the shear modulus of the fiber). For these reasons, the shear modulus in the model is also reduced. In addition to reducing the shear stiffness of the fiber subcells following a transverse interface failure, the transverse stiffness of the fiber subcell is also reduced. This prevents artificial or nonexistent strength of the unit cell provided by a failed bond and its corresponding Poisson ratio.

The current model reduces the shear modulus by 99%, however this estimate can be improved with experiments like a three-rail shear test or combined experiments that would load a sample such that interface failure would be indicated and then the sample would then be tested in a three-rail shear test.

Two different failure criteria can track similarly presenting failures. Interface debonding and matrix tensile failure may be the same failure or at least, they may be indistinguishable. For instance, transverse interface failure can be indicated by the transverse criteria quotient, and reductions taken due to that failure. In this case, transverse matrix failure in the 3478 half-cell would be ignored since it is no longer the major mode of failure. In future iterations of this method, the matrix failure criteria would change following an interface failure such that it checks only the principal strains in the feasible loading directions. An interface failure would preclude further loading in the transverse directions, therefore any further failures in a matrix subcell would need to be due to loading in the remaining loading directions.

302B, 304B, 306B, 308B shows a similar progression, however the strand is under transverse compression and either longitudinal tension or compression. The major difference between these two scenarios is that despite interface failure, transverse stiffness ($E^s_y$) is not reduced since the matrix is intact and remains in contact with the other two subcells. The major reduction in stiffness would be the in-plane shear stiffness, since the shear stiffness, provided by the bond between the 3478 half-cell and 1256 half-cell no longer exists. There would likely be frictional contact sustaining some shear stress, but it is ignored. Furthermore, similar to the interface failure under transverse tension, the shear strength of the fiber subcell is reduced following the removal of the support from the failed interface. Subsequent failures in this case can be fiber failure (elongation or buckling), matrix failure by maximum principal strain, though the stress state in this case is $[\sigma_x, \sigma_y, \sigma_z, 0, \tau_{xz}, 0]^T$.

Under compression, an interface failure would likely only cause a reduction in the shear stiffness of the lamina as well as a reduction in the fiber buckling strain, since one of the supporting matrix subcells has debonded. Similar to the above scenario, the additional failures following interface failure allow for further reductions in the strand's stiffness.

Unlike uniaxial composite, in a laminate, initial failure is likely not ultimate failure. The load borne by the structure will most likely cascade to the remaining intact (or partially intact) load bearing members. In a homogenized laminate, the stiffness contribution of the failed lamina would be appropriately reduced as required by the indicated failure, and the stiffness matrix for the laminate would be re-homogenized. In a finite element software, the stiffness contribution of a failed section point would be similarly reduced and then re-homogenized in accordance with the modeling technique.

In order to reduce the post-failure stiffness of the unit-strand, the upscale and downscale routines require information regarding which cell and the failure direction of that cell. For three matrix quarter-cells and three directions, this requires nine pieces of information for each analysis point. These nine entries can be included in a 3-by-3 matrix. The columns of the matrix describe the failure directions: x, y and z; while the rows of the matrix describe the subcells that have failed. An entry of zero in any position indicates an undamaged state. An entry of one in a position indicates a fully failed state. This matrix is referred to as failang.

Entries in failang are attributed to failed states and combinations of failed states. For instance, a 1 in the (1,1) position of failang describes a failure in the 34-subcell in the x direction, and a 1 in the (2,2) position describes a failure in the 56-subcell in the y direction. The matrix failang is a convenient way to control the reduction of the properties of the constituents in the transformation matrix in order to obtain a degraded material constitutive matrix.

To simplify the storage of failang, the failure modes it describes can be broken into the three individual directions for failure. Transverse failures in the y direction—3478 interface failures and 3478 matrix failures—can be represented in failang as:

$$\text{failang}_y = \begin{bmatrix} 0 & 1 & 0 \\ 0 & 0 & 0 \\ 0 & 1 & 0 \end{bmatrix}$$

and similarly for failures in the x and z directions. Using this method, all normal failures and their combinations can be described by the sum of these three matrices. Above, reductions in shear stiffness were associated with normal failures;

using these associations, all reductions to stiffness—both shear and normal—following a failure can be described by a normal failure only. This also reduces the information required to be stored regarding failure status of an integration point to three variables. The three variables scale predetermined matrices, which sums to failang:

$$\text{failang} = \zeta_1 \begin{bmatrix} 0 & 1 & 0 \\ 0 & 0 & 0 \\ 0 & 1 & 0 \end{bmatrix} + \zeta_2 \begin{bmatrix} 0 & 0 & 0 \\ 0 & 0 & 1 \\ 0 & 0 & 1 \end{bmatrix} + \zeta_3 \begin{bmatrix} 1 & 0 & 0 \\ 1 & 0 & 0 \\ 1 & 0 & 0 \end{bmatrix} \quad (40)$$

where $\zeta_n$ represents the amount of reduction in strength due to each failure type, varying between zero and one. For example, a 3478 half-cell interface failure with a 1% reduction in y strength combined with a 50% reduction due to a 5678 half-cell interface failure would yield:

$$\text{failang} = 0.01 \begin{bmatrix} 0 & 1 & 0 \\ 0 & 0 & 0 \\ 0 & 1 & 0 \end{bmatrix} + 0.5 \begin{bmatrix} 0 & 0 & 0 \\ 0 & 0 & 1 \\ 0 & 0 & 1 \end{bmatrix} + 0.0 \begin{bmatrix} 1 & 0 & 0 \\ 1 & 0 & 0 \\ 1 & 0 & 0 \end{bmatrix} = \begin{bmatrix} 0 & 0.01 & 0 \\ 0 & 0 & 0.5 \\ 0 & 0.01 & 0.5 \end{bmatrix}$$

This scheme would then only require the storage of the $\zeta_n$ and a $\zeta_f$, indicating a reduction in strength due to a fiber failure. While either zero or one are currently used in failang, these fractional values can be input to indicate fractional reductions of the properties at an interface or within a subcell. These fractional reductions can be used in a damage description where the composite under examination progressively softens over the analysis steps.

In some finite element software, provision for the evolution of damage or progressive softening of a material is allowed such that the energy dissipated in the failure of a material agrees with experiment. This damage evolution is also employed to improve stability of an implicit calculation involving progressive damage such that softening can be accomplished over a few increments rather than all at once.

The finite element software Abaqus describes its method for accomplishing this in the Abaqus user manual Section 24.3.1. In general, the stiffness of a material is modeled as linear-elastic until a damage initiation criterion is satisfied. Following damage initiation, the material is progressively softened based on the energy dissipated during the damage process. The progress of damage is controlled by a damage variable that varies from zero to one, reducing portions of the stiffness matrix based on the type of failure indicated by the initiation criterion. This approach can be implemented using failang by considering the appropriate $\zeta_n$ as the damage variable which increases following an indicated failure from zero to one (intact to fully failed) through the fractional values required by the energy release rate.

For uniaxial samples, ultimate failure can be simple to predict, since a single failure likely indicates ultimate failure. The complete strength of the sample is typically lost due to that failure. In a lamina however, the load previously carried by a ply that has failed in a particular way is redistributed to the adjacent plies that are capable of carrying the transferred load. The stress-state in a laminate becomes complex due to the various material orientations and their associated orthotropy. What would normally be a simple biaxial state in an isotropic (or uniaxial orthotropic) material becomes a complex $\sigma_x$-$\sigma_y$-$\tau_{xy}$ state of stress. This is further complicated with the unloading of a failed ply and the redistribution of its load to the adjacent plies. Ultimate failure in uniaxial composites, described above, was indicated when a single failure of a lamina represented ultimate failure. Simple criterion like "excessive strain" or "an inability to increase the applied load" are objectively true, however a more finite means of measuring failure is needed to determine failure since first ply failure would likely yield needlessly conservative estimates for failure. When determining ultimate failure while applying the present model to the WWFE tasks, an approach was used that quantifies the planar components of strain. This approach uses a change of "strain radius" where the strain radius allows the capture of the change of any single (or all three) strain quantities due to the failure of a ply. In the following form, it treats a change in any strain equally:

$$r_\varepsilon = \sqrt{(\varepsilon_x^c)^2 + (\varepsilon_y^c)^2 + (\gamma_{xy}^c)^2} \quad (41)$$

This form can be modified to change the weight of the contributing factors.

The strain radius can be used in three ways. As a measure of resultant strain, a maximum strain at a point of interest can be chosen and analysis can be stopped, indicating composite failure. Alternatively, the first derivative of the strain radius with respect to the load can provide a "cost" of the next load increment in terms of strain—analogous to "marginal cost," and termed marginal strain. Lastly, the second derivative of the strain radius with respect to load allows the determination of both the area of maximum curvature of the strain radius curve as well as the inflection point of the marginal strain curve by peak-finding.

As loading of a composite progresses prior to major failures, the strain increases at a slow rate, commensurate with the small reductions in the stiffness of the loaded and (partially) failed ply. As damage continues, the strain radius (or resultant strain) increases more rapidly until it begins to grow without bound.

The most convincing indication of failure in a simulation would be either the growth without bound of the displacement of all (or a portion) of the composite sample under test—analogous to a sample rupture, or the decrease to near zero of the load applied to the composite—analogous to extreme softening of the sample. In order to load the sample, either a pressure load on the surface of the sample laminate, or a displacement of the outer surfaces of the composite can be prescribed. In the case of the displacement, a loading condition must be prescribed on the outer surfaces and monitor the displacement of a telltale portion of the composite. In the case of load-carrying capacity, a nodal displacement is imposed on the sample and the reaction forces are monitored.

A Python script was used to generate failure envelope for the laminated composite from the finite element solver. Similar to the MATLAB envelope, a radar search was devised that changed the loading of the composite under test to follow chosen loading ratios. Each loading ratio was divided into 40 equal steps in order to accurately locate the features of failure as a percentage of the loading ratio. Likewise, each quadrant was divided into 50 sectors each corresponding to a loading ratio.

Once the solution is complete for a particular loading ratio, the Python routine extracts the history variables for the position of the center node, calculates their norms and differentiates twice. This data for each of the "slices" of each quadrant is written to a text file where it could be imported and parsed by a simple routine.

The method pursued to determine if failure has occurred in the Abaqus simulation was the plotting of the strain of the middle elements in both x, y and shear. These strains were then used to compute a single magnitude to measure the middle elements. The second derivative of the strain radius (Equation 41) with respect to the applied load was taken to locate the area of greatest curvature of the strain radius curve. These locations can correspond to initial and final failures of the composite under test.

Using this scheme in the first quadrant for the laminate, it can be seen that in some cases there are small perturbations in the second derivative, indicating that the rate of displacement is changing, followed by larger values for the second derivative, showing large curvature in the displacement curve. Small perturbations in the second derivative are assumed to mean that there are intermediate (but not completely fatal) failures in the composite. At these loading points, the composite's rate of displacement increases owing to the reduction in stiffness of a failed ply. The larger perturbations are indicative of rapid change in the growth of the displacement, which are assumed to mean that they are the location of ultimate failure.

With the multiscale model described with respect to FIGS. 1 and 2A, the failure model it enables which is described with respect to FIG. 2B, and the progressive damage model described here, all the portions that are required for inclusion in either simple estimating methods like a MATLAB routine or more complex implementations in finite element software are present. These concepts are to be combined in a single Fortran routine such that they can be used in finite element software to provide composite properties, failure indications, and degraded material properties in the case of failure. Below this routine and its operation is described, followed by its use and performance against experimental data.

Initial development and testing of the proposed failure theory was conducted in the MATLAB software. Transitioning the failure theory and multiscale method from MATLAB to finite element software would increase their applicability and utility from simple models to more complex composite structures. This section describes the mechanics required to interface the multiscale failure theory with finite element solvers.

FIG. 5 illustrates a workflow 500 for modeling fibrous composites. As is the case with the other processes described herein, various embodiments may not include all of the steps described below, may include additional steps, and may sequence the steps differently. Accordingly, the specific arrangement of steps shown in FIG. 5 should not be construed as limiting the scope of removably forming a part on a porous substrate.

In block 504, material properties are obtained for a model of a fibrous composite. For example, finite element solvers such as those provided by ABAQUS, ANSYS, CALCULIX, NASTRAN, among others, can use a subroutine to calculate or provide the material properties (e.g., constitutive relationships) based on input data. Finite element solvers typically allow a more flexible interface for a user to input their own constitutive model for materials they desire to model.

The "user defined material" is an additional way for a user of a finite element package to provide material information to the software about the structure or material under examination. Under normal use, a finite element package can take as input the material properties of a structure as engineering constants, or tabular data. Most software has very flexible ways to input this data and allow for many different methods to change and manipulate this data as the solution progresses, however if a material model does not conform to these entry requirements, a user defined material script or "UMAT" must be constructed.

The user materials interface is different from most uses of finite element software implementation since it takes state information from the solver: time, temperature, strain, location, etc., and uses this information in any way the user requires to provide the constitutive relationships of that integration point and an updated state of stress and strain based on any in-step changes to the material properties. This flexibility is a perfect platform for the implementation of the multiscale model.

The finite element solver describes the material used in a model in relation to the elements used. If the material is described as a composite layup, the finite element solver breaks the thickness or stacking direction into layers, with the material properties (modulus, orientation, etc.) assigned to each layer. Each layer can then be assigned an odd number of section points (user assignable) that describe points in each of the layers' thickness. FIG. 4 shows the relationships between section points 404 and integration points 406. The section points 404 should be odd since they identify the top, middle and bottom of the layer 402. In the plane of the element 402, the section points 404 are in alignment with the integration points 406 of the element. The user material subroutine is called at each section point 404 of each element in each increment of the solver's solution process.

For an iteration of the model, each integration point in the model is processed. In block 506, it is determined whether there are more integration points to process. If there are more integration points to process, workflow 500 proceeds to block 508 to process the next integration point.

In block 508, composite level stresses and strains are determined for the fibrous composite. Specifically, the composite level stresses and strains are determined based on the material properties from the finite element solver. A benefit of the described workflow 500 is that the degraded properties of the fibrous composite can be calculated before the analysis. Composite-level constitutive relationships for each type of failure (and all combinations of failures) can be formed from the constituent properties in the first iteration and stored as reference values, allowing the workflow 500 to avoid matrix inversions and decompositions unrelated to solving the finite element problem, potentially significantly speeding up the workflow's 500 performance.

In block 510, composite level stresses and strains are decomposed into component level stresses and strains. For example, the downscale operation can be performed as described above using subroutines and appropriate linear algebra libraries.

In this example, a relationship matrix T is formed from the undamaged or damaged constituent material properties and is partially inverted forming the downscaling matrix R using a linear algebra solver such as the LAPACK solver DGESV (double precision, general matrix, linear solver). The linear solver obtains R by solving the linear system $TR=\{e_{22}\ e_{23}\ e_{24}\}$ by lower-upper (LU) decomposition, where $e_n$ are the 22nd through 24th unit vectors.

As a sub-function in the UMAT, the Downscale subroutine takes the R matrix returned by DGESV and uses it to decompose the normal strains input into the UMAT by the solver to normal strains in each subcell though matrix-vector multiplication: $R\varepsilon^{global}=\varepsilon^{subcell}$.

The shear strains are calculated using the shear strains input by the solver, the shear modulus of the unit-strand constituents, and the section-point failure status from the current (or previous) solution-step of the workflow 500. The process uses the relationships above, Equations 13 through 18 to decompose the global shear strains to subcell shear strains. For an undamaged composite, the calculation is straightforward; however, for damaged composite, the routine degrades the shear modulus of the half-cell by the proportion indicated in the failang matrix.

In block 512, failure criteria are applied at the integration point. Specifically, failure criteria are applied to determine if a failure has occurred, where the failure can be fiber failure in tension (Equation 25), fiber failure in compression (Equation 26), fiber/matrix interface failure (Equation 27), and/or matrix failure (Equation 37).

In block 514 if a failure is detected, a corresponding material reduction model (i.e., fiber failure in tension, fiber failure in compression, fiber/matrix interface failure, and/or matrix failure) is applied at the component level. For example, the subcell stresses and strains calculated during the downscale portion can be used to determine the damage initiation quotients. The fiber and interface quotients are calculations based on the stresses and strains; however, the matrix failure criterion relies on an additional subroutine that takes the subcell's strain tensor and calculates the principal strains for comparison to the matrix failure strain. This eigenvalue-solving subroutine can be an implementation of the program found in Ungural and Fenster, Advanced Strength and Applied Elasticity, 4th ed (Upper Saddle River, N.J.: Prentice Hall, 2003).

In block 516, the material properties of the model are updated at the composite level to account for any failures that may have occurred. Specifically, the failures applied above at the component level can be upscaled to the composite level and incorporated into the material properties. The upscale routine can be established following the formation of R during the downscale portion. For example, the upscale calculation can be the same calculation described above. The constitutive relationship defined by this upscale operation is then stored as a return variable to the finite element solver.

In block 518, a determination is made as to whether a composite failure has occurred. The composite failure determination can be performed as described above. If a final failure has occurred, the workflow 500 can proceed to block 522 and stop. If a final failure has not occurred, the workflow 500 can return to block 506 to process the next integration point. In this manner, each integration point in the model can be processed for the current iteration.

After all the integration points have been processed, workflow 500 proceed to block 520 to initiate the next iteration of the model. The next iteration of the model can be performed to proceed to the next time interval. In some cases, the force being applied to the fibrous composite can also be modified in the next iteration.

Workflow 500 then proceeds to execute the next iteration of the model in blocks 504-518.

Workflow 500 can be performed to test various designs of fibrous composites. In this manner, various configurations of fibrous composites can be evaluated to identify configurations that satisfy performance requirements. If a fibrous composite is determined to fail at less than the target requirements, the fibrous composite can be iteratively redesigned and tested until it satisfies the requirements.

Crucial to the operation of the UMAT is the storage and reference to the state of the section point. The UMAT records all subcell strains and stresses at each increment for each section point. For large models, this storage, especially if written as a history variable, can become too large. The UMAT routine, which implements the micro model as well as the failure model with damage progression, currently stores all quarter-cell stresses and strains. In addition to storing the stresses and strains of the quarter-cell, the UMAT also computes and stores the general failure state and the individual values for each failure quotient. Lastly, it stores the three values for $\zeta$, which control the value for failang, directly impacting the computed stiffness of the failed integration point/section point.

Also included in the state variables are the failure quotients from the six failure criteria (fiber, 34-interface, 56-interface, 34-matrix, 56-matrix, 78-matrix) and the previous solution increment failure state. These data (and the subcell stresses and strains used to compute them) are the essential data stored in the state variable array.

The link between the multiscale failure model and finite element software is now completed through the use of the UMAT. The UMAT framework also affords the flexibility for improvements to the failure model using multiscale calculations. In addition to identifying failure, the UMAT also includes the progressive failure logic and post-failure stiffness reduction technique.

The multiscale failure model provided reasonably successful representations of the failure envelopes for a wide variety of fibrous composites—varying in both material and construction. Shortcomings of the outputs, namely over prediction of failure stresses in some stress regions and an earlier-than-expected prediction of interface failures in others, require more analysis. Overall, the performance of the implementation to this dataset was encouraging. Comparisons to additional datasets is also desired.

In addition to demonstrating model validity and effectiveness, cylinder testing led to other experimental observations such as observations concerning the utility of the clamshell shims, the superior performance of DIC for strain measurement over foil strain gauges, and precautions required during testing to obtain satisfactory results. These observations will lead to improvements in testing procedures, data collection capabilities, and modeling techniques. Furthermore, unexpected trends seen in the carbon cylinder data and the finite element simulations with regard to the performance of the cylinder as a function of its outermost winding will provide valuable insight into methods used to design composite layups for optimal structures.

Parametric studies provide valuable insight into the operation of the composite failure model. They provide a check to ensure that the model does not produce spurious results under reasonable perturbations, while at the same time provide estimates as to how a composite would perform if the constituents were altered. In the case of the altered $E^f$ for $\sigma_x$-$\tau_{xy}$, a shortfall of using a composite-level failure stress in the failure model formulation is demonstrated. A better formulation and an object for further research is altering the interface failure criteria such that, like the fiber failure criteria and the matrix failure criteria, it utilizes constituent properties exclusively. The remainder of the parametric studies provide reasonable or explainable results, but results that should be confirmed with modeling and experimentation.

The multiscale method for fibrous composites was first defined, and its computation was adapted to a finite element user material. Using experimental data as a guide, the outputs from the computation of the model were observed in stress-space. They were then combined to generate a separate mode failure criteria that shares same functional forms with previous criteria. These criteria are unique in that they use additional geometric considerations as well as calculations made possible by the multiscale method to account for more realistic failure modes. The proposed failure criteria, unlike most typical criteria, successfully reproduces features in experimentally derived failure envelopes in the three stress planes and is easily used for many different composites of varying properties.

Initial failure in a complex structure may not lead immediately to complete failure of the structure, but rather to a gradual degradation. For this purpose, the failure criteria was combined with a logical framework that postulated potential degradations to individual portions of a composite. This degradation model then used the multiscale model to recalculate the stiffness properties of a composite. The failure model and degradation framework combine to form a flexible composite analysis tool.

The analysis tool proposed can calculate macro-level composite properties, check for local failures, and degrade the properties if failure is indicated. The failure model and framework discussed, distinct from other methods, is comprehensive. It forms a single coordinated method that estimates composite properties from constituent properties, estimates composite strengths based on constituent strengths and experimental data, identifies failure initiation, and degrades material properties based on failure.

The failure and degradation model was then implemented in Fortran so it may be used infinite element software as a user-defined material. As such, the multiscale method reports the undamaged material properties for the construction of the elemental stiffness matrix. While not computationally optimal, the method carries a small computational overhead and is simply implemented.

The multiscale failure and degradation model was then tested using data from the World-Wide Failure Exercise which afforded an enormous set of data using varied materials and varied loading conditions. Against this data the model provided a reasonable representation of the failure of the subject composite, both uniaxial and laminated. For additional validation, filament wound cylinders were constructed and destructively tested. These tests were then modeled with finite elements so that stress-strain data and final failure values predicted by the multiscale failure and degradation model could be compared with additional experimental results.

In the course of these experiments, novel experimental methods and data processing schemes methods were devised. These methods included improvements to test specimen construction, the joining of data collected on unconnected measurement systems, as well as the construction of devices that enable the collection of data during many-channel experiments.

Lastly, observations during these experiments regarding the placement of strain gauges on composite samples and best-practices for successful tests as well as areas for further research were presented.

The failure model also enables a user to conduct what-if analyses to determine a composite's response to changed parameters. The model was used for a simple parametric study in which the input constituent properties were altered, showing the variability of and the sensitivity of the model to the variation of the properties of the composite. Analyses such as this can enable a designer to better select composite reinforcement and matrix combinations as well as layup angles in a structure to optimize a design's performance.

The work described here could benefit from additional explorations and improvements, coding efficiencies, validation of assumptions by experiment, and exercising the model with additional modeling scenarios.

Applicability—This model and the UMAT derived from it appear to perform successfully while analyzing uniaxial and multi-angle continuous fibrous composites, however, the range of applicability of this model needs to be better understood such that it can be used in appropriate situations when it will the appropriate failure model to use Computational Improvements—The current form of the UMAT, while functional, is likely not computationally efficient. The current form of the upscale/downscale formulation uses a linear algebra solving routines to extract the downscaling matrix. Efficiencies may be obtained by including an included subroutine that solves for the downscaling matrix rather than using the linear algebra library function, perhaps requiring less computational overhead. In addition to exploring whether alternative functions would yield improvements, the relationship matrix is a sparse matrix. Sparse matrix solvers may also provide improved performance.

More improvements to the UMAT would be a minimization of branching inside the subroutine. The current form has a significant amount of branching due to the if . . . then statements that are used for detecting and accounting for failures in the composite's integration point. The minimization or elimination of this branching would be required to modify the UMAT for use as a subroutine in Abaqus' explicit solver which requires that the UMAT be vectorized—a VUMAT.

The sum of the UMAT's computations may also be done a priori. Intact and damaged downscaling matrices and constitutive relationships can be calculated as part of model pre-processing, and stored for later access by the subroutine rather than computing these values at each integration point and each loading increment. Initial explorations using this technique were unsuccessful; however, it could prove a benefit for large models.

Validation of the assumptions by experiment—The plots of laminated composites included potential intermediate failures of plys at levels of low loading as compared to the ultimate failure. It is unknown whether this indication is actual or not. Some failure models are based on the accumulation of microcracks in a composite, perhaps this indication is the beginning of the formation of microcracks. In order to explore this assumed behavior, a laminated composite beam could be constructed and loaded prior to ultimate failure, but beyond the assumed intermediate failure load. After this loading, nondestructive testing (ultrasonic, radiographic, acoustic, shearographic) could be conducted to determine if intermediate failures are present, and attempt to quantify them.

Real Structure Damage Detection—Finite element models of composite structures can be used in conjunction with real-world testing to localize structural damage. This damage detection method could potentially be used as a nondestructive method for determining composite intermediate failures such as those discussed above. Laminated composite beams or tubes could be constructed and stressed to a level higher than where intermediate failures are predicted, but short of ultimate failure. Once these potentially compromised specimen are prepared, known techniques could be used to determine whether the failures are present or not.

Additional Parametric Studies—Additional studies could be conducted that examine sensitivity to failure 'anchor points' as input data. It is important to know how and how significantly an envelope changes for varying input values of $\varepsilon^f_{u,t}$, $\varepsilon^f_{u,c}$, $\varepsilon^m_c$, $\varepsilon^m_c$, $\tau_u$, $\sigma_\perp$.

Modeling of Alternate composites—The failure model can be extended for use in composites other than uniform uniaxial composite and laminated composite with single orientations. The model, since it is implemented on the "material" level can be used very flexibly. For instance, chopped strand mat could be modeled using randomized orientations of the UMAT material model. The model can also be validated for its applicability to woven composites.

Known techniques for woven composites in the context of multiscale modeling, the multiscale failure model would likely be able to be tailored for use in a composite textile application.

Modeling of Complex Structures—Additional exploration of the multiscale method and the failure model should be conducted using additional benchmarking problems such as structures with more complex features. Classic benchmark problems including panels with holes and panels with stiffeners can be modeled using the multiscale failure model to further explore its applicability. These benchmark problems form an essential step to using the method and model for more comprehensive composite structural analysis.

In addition to structures with planned features such as holes and stiffeners, structures with inclusions and delaminations can be modeled in finite element software. Tests can be made with the multiscale failure model and finite element simulations of structures with inclusions using cohesive contact, crack propagation and element deletion.

Temperature Effects—Thermal stresses in composites are included in known studies and techniques, and can be implemented in the UMAT devised for this implementation. Additional parametric studies can be conducted to determine the impact that temperature changes have on the prediction of a failure envelope. Additional experiments can be conducted to compare the prediction of the multiscale failure model to an actual composite subjected to higher and lower temperatures.

Figure 6:
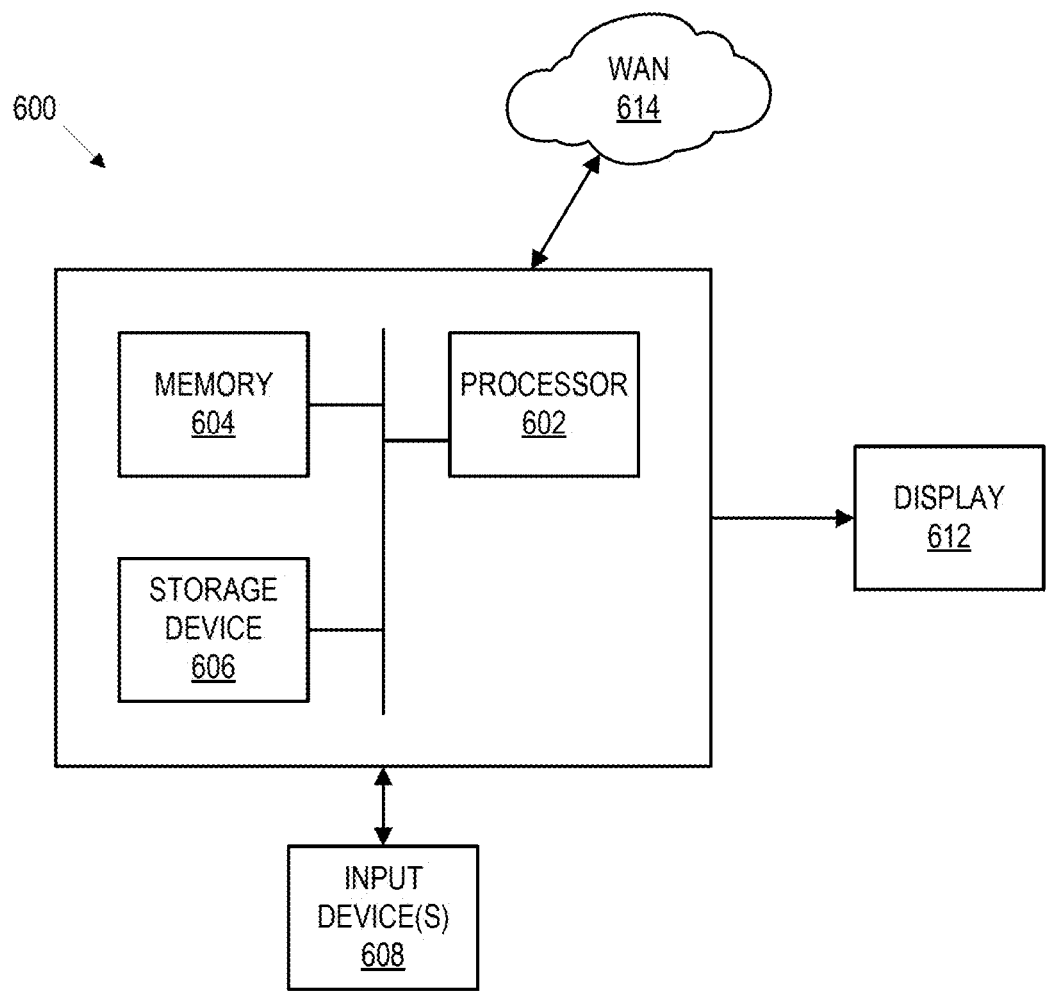
FIG. 6 illustrates an example computing system for executing modeling of fibrous composites.

The invention may be implemented on virtually any type of computer regardless of the platform being used. For example, as shown in FIG. 6, a computer system 600 includes a processor 602, associated memory 604, a storage device 606, and numerous other elements and functionalities typical of today's computers (not shown). The computer 600 may also include input means 608, such as a keyboard and a mouse, and output means 612, such as a monitor. The computer system 600 may be connected to a local area network (LAN) or a wide area network (e.g., the Internet) 614 via a network interface connection (not shown). Those skilled in the art will appreciate that these input and output means may take other forms.

Further, those skilled in the art will appreciate that one or more elements of the aforementioned computer system 600 may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method for modeling fibrous composites, the method comprising:
(a) obtaining, using a computer processor, material properties for a computer model of a fibrous composite, wherein the computer model comprises a plurality of integration points and a plurality of unit cells;
(b) obtaining real-world structure data by:
constructing a laminated composite according to the material properties;
loading the laminated composite at a predicted level to generate intermediate failures but short of ultimate failure; and
analyzing the loaded laminated composite to obtain the real-world structure data;
(c) for each integration point of the fibrous composite:
determining composite level stresses and strains based on the material properties and the real-world structure data;
decomposing the composite level stresses and strains into component level stresses and strains for the integration point;
using the component level stresses and strains to calculate failure quotients at the integration point;
selecting an appropriate material reduction model based on a type of failure, wherein the type of failure is determined based on failure quotients;
applying the appropriate material reduction model at a component level based on the failure quotients;
upscaling a component failure to determine updated material properties at a composite level; and
incorporating the updated material properties into the computer model; and
(d) repeating step (c) for each iteration of the computer model until a composite failure is detected in the updated computer model
wherein the type of failure is a fiber failure in tension, and wherein the type of failure is determined based on a failure criterion represented as:

$$\frac{\sqrt{(\varepsilon_x^{12})^2 + (\gamma_{xy}^{12})^2 + (\gamma_{xz}^{12})^2}}{\varepsilon_{u,t}^f} \geq 1$$

where $\varepsilon_x$ is matrix material subcell stiffness, $\gamma_{xy}$ and $\gamma_{xz}$ are subcell strains, and $\varepsilon_{u,t}^f$ represents fiber elongation at failure
wherein x represents the x-direction, y represents the y-direction, and z represents the z-direction,
and wherein each of the plurality of unit cells comprises two subcells which represent a fiber, where the 12 in the model represents the two subcells.

2. The method of claim 1, wherein decomposing the composite level stresses and strains comprises:
generating a relationship matrix based on the material properties;
partially inverting the relationship matrix to generate a downscaling matrix; and
using the inverted relationship matrix to decompose the composite level stresses and strains to the component level stresses and strains.

3. The method of claim 2, wherein upscaling the component failure to determine the updated material properties at the composite level comprises:
multiplying a combined stiffness matrix and the downscaling matrix to generate a distributed stiffness matrix;
linearly combining and weighting directional stiffnesses to generate a normal stiffness matrix for the fiber composite; and
inverting the normal stiffness matrix, wherein the updated material properties are extracted from the inverted normal stiffness matrix.

4. The method of claim 3, wherein upscaling the component failure to determine the updated material properties at the composite level further comprises:
- estimating a shear modulus of each half cell of a target unit cell by combining corresponding shear moduli of corresponding quarter cells, wherein each of the corresponding shear moduli is weighted by a cross-sectional area of corresponding quarter cell in a plane of interest; and
- combining the shear modulus of the half cells to obtain an upscaled shear modulus for the target unit cell, wherein the updated material properties also includes the upscaled shear modulus.

5. The method of claim 1, wherein the appropriate material reduction model is one selected from a group consisting of a fiber failure in tension model, a fiber failure in compression model, a fiber-matrix interface failure model, and a matrix failure model.

6. The method of claim 1, wherein each of the plurality of unit cells comprises eight subcells, and wherein two of the eight subcells represent fiber properties of the fibrous composite and six remaining cells of the eight cells represent matrix properties of the fibrous composite.

7. A non-transitory computer-readable medium comprising executable instructions for modeling fibrous composites by causing a computer system to:
- (a) obtain material properties for a computer model of a fibrous composite, wherein the computer model comprises a plurality of integration points and a plurality of unit cells;
- (b) obtain real-world structure data by:
  - constructing a laminated composite according to the material properties;
  - loading the laminated composite at a predicted level to generate intermediate failures but short of ultimate failure; and
  - analyzing the loaded laminated composite to obtain the real-world structure data;
- (c) for each integration point of the fibrous composite:
  - determine composite level stresses and strains based on the material properties and the real-world structure data;
  - decompose the composite level stresses and strains into component level stresses and strains for the integration point;
  - use the component level stresses and strains to calculate failure quotients at the integration point;
  - select an appropriate material reduction model based on a type of failure, wherein the type of failure is determined based on failure quotients;
  - apply the appropriate material reduction model at a component level based on the failure quotients;
  - upscale a component failure to determine updated material properties at a composite level; and
  - incorporate the updated material properties into the computer model; and
- (d) repeat step (c) for each iteration of the computer model until a composite failure is detected in the updated computer model wherein the type of failure is a fiber failure under compression, and wherein the type of failure is determined based on a failure criterion represented as:

$$\frac{\sqrt{(\varepsilon_x^{12})^2 + (\gamma_{xy}^{12})^2 + (\gamma_{xz}^{12})^2}}{\varepsilon_{u,c}^f} \geq 1$$

where $\varepsilon_x$ is matrix material subcell stiffness, $\gamma_{xy}$ and $\gamma_{xz}$ are subcell strains, and $\varepsilon_{u,c}^f$ is a fiber and composite longitudinal strain at a stated compressive stress, and wherein $\varepsilon_{u,c}^f$ is calculated using:

$$\varepsilon_{u,c}^f = \frac{\sigma_u^C}{E_x^C}$$

where $\sigma_u^C$ is macro-scale normal stress for a target unit cell and $E_x^C$ is macro-scale longitudinal Young's Modulus, wherein the superscript C represents the composite macro-scale values, wherein x represents the x-direction, y represents the y-direction, and z represents the z-direction, and wherein each of the plurality of unit cells comprises two subcells which represent a fiber, where the 12 in the model represents the two subcells.

8. The computer-readable medium of claim 7, wherein decomposing the composite level stresses and strains comprises:
- generating a relationship matrix based on the material properties;
- partially inverting the relationship matrix to generate a downscaling matrix; and
- using the inverted relationship matrix to decompose the composite level stresses and strains to the component level stresses and strains.

9. The computer-readable medium of claim 8, wherein upscaling the component failure to determine the updated material properties at the composite level comprises:
- multiplying a combined stiffness matrix and the downscaling matrix to generate a distributed stiffness matrix;
- linearly combining and weighting directional stiffnesses to generate a normal stiffness matrix for the fiber composite; and
- inverting the normal stiffness matrix, wherein the updated material properties are extracted from the inverted normal stiffness matrix.

10. The computer-readable medium of claim 9, wherein upscaling the component failure to determine the updated material properties at the composite level further comprises:
- estimating a shear modulus of each half cell of a target unit cell by combining corresponding shear moduli of corresponding quarter cells, wherein each of the corresponding shear moduli is weighted by a cross-sectional area of corresponding quarter cell in a plane of interest; and
- combining the shear modulus of the half cells to obtain an upscaled shear modulus for the target unit cell, wherein the updated material properties also includes the upscaled shear modulus.

11. The computer-readable medium of claim 7, wherein the appropriate material reduction model is one selected from a group consisting of a fiber failure in tension model, a fiber failure in compression model, a fiber-matrix interface failure model, and a matrix failure model.

12. The computer-readable medium of claim 7, wherein each of the plurality of unit cells comprises eight subcells, and wherein two of the eight subcells represent fiber properties of the fibrous composite and six remaining cells of the eight cells represent matrix properties of the fibrous composite.

* * * * *